United States Patent
Bodin et al.

(10) Patent No.: US 7,437,443 B2
(45) Date of Patent: Oct. 14, 2008

(54) ADMINISTERING DEVICES WITH DOMAIN STATE OBJECTS

(75) Inventors: William Kress Bodin, Austin, TX (US); Michael John Burkhart, Round Rock, TX (US); Daniel G. Eisenhauer, Austin, TX (US); Daniel Mark Schumacher, Pflugerville, TX (US); Thomas J. Watson, Pflugerfville, TX (US)

(73) Assignee: International Business Machines Corporation, Armonk, NY (US)

(*) Notice: Subject to any disclaimer, the term of this patent is extended or adjusted under 35 U.S.C. 154(b) by 758 days.

(21) Appl. No.: 10/612,702

(22) Filed: Jul. 2, 2003

(65) Prior Publication Data

US 2005/0005002 A1 Jan. 6, 2005

(51) Int. Cl.
*G06F 15/173* (2006.01)
(52) U.S. Cl. .................. 709/223; 719/327
(58) Field of Classification Search ............. 719/321, 719/327; 709/223, 227
See application file for complete search history.

(56) References Cited

U.S. PATENT DOCUMENTS

| | | | | |
|---|---|---|---|---|
| 5,181,200 A | * | 1/1993 | Harrison | 370/468 |
| 5,212,806 A | * | 5/1993 | Natarajan | 455/525 |
| 5,491,837 A | * | 2/1996 | Haartsen | 455/62 |
| 5,564,070 A | * | 10/1996 | Want et al. | 455/507 |
| 5,571,195 A | * | 11/1996 | Johnson | 623/23.44 |
| 5,802,146 A | * | 9/1998 | Dulman | 379/32.03 |
| 5,825,759 A | * | 10/1998 | Liu | 370/331 |
| 5,996,010 A | * | 11/1999 | Leong et al. | 709/223 |
| 6,078,815 A | * | 6/2000 | Edwards | 455/450 |
| 6,108,654 A | * | 8/2000 | Chan et al. | 707/8 |
| 6,345,264 B1 | | 2/2002 | Breese et al. | 706/21 |
| 6,418,424 B1 | | 7/2002 | Hoffberg et al. | 706/21 |
| 6,519,235 B1 | * | 2/2003 | Kim et al. | 370/331 |
| 6,577,637 B1 | * | 6/2003 | Sieppi | 370/401 |
| 6,848,000 B1 | * | 1/2005 | Reynolds | 709/226 |
| 6,971,063 B1 | * | 11/2005 | Rappaport et al. | 715/733 |
| 7,016,325 B2 | * | 3/2006 | Beasley et al. | 370/331 |
| 7,031,279 B2 | * | 4/2006 | Lee et al. | 370/331 |
| 7,082,116 B2 | * | 7/2006 | Reza et al. | 370/338 |
| 7,085,260 B2 | * | 8/2006 | Karaul et al. | 370/352 |
| 7,164,883 B2 | * | 1/2007 | Rappaport et al. | 455/3.01 |
| 2002/0013856 A1 | * | 1/2002 | Garcia-Luna-Aceves et al. | 709/238 |
| 2002/0043568 A1 | | 4/2002 | Hess et al. | |
| 2002/0095586 A1 | | 7/2002 | Doyle et al. | |
| 2002/0135618 A1 | * | 9/2002 | Maes et al. | 345/767 |
| 2002/0184373 A1 | | 12/2002 | Maes et al. | |
| 2003/0137947 A1 | * | 7/2003 | Roy et al. | 370/310 |

(Continued)

OTHER PUBLICATIONS

RD 453129, Jan. 2002, p. 108 "Remote Controlling System for Home Electronic Equipment via Email."

*Primary Examiner*—Van H Nguyen
(74) *Attorney, Agent, or Firm*—H. Artoush Ohanian; Justin Dillon; Biggers & Ohanian, LLP

(57) ABSTRACT

Exemplary embodiments of the present invention include a method for administering devices. Such exemplary embodiments include receiving a domain state object, identifying an action in dependence upon the domain state object, and executing the action. In many exemplary embodiments, receiving a domain state object includes receiving a signal to download the domain state object from a mobile sensor, and downloading the domain state object from the mobile sensor.

12 Claims, 20 Drawing Sheets

U.S. PATENT DOCUMENTS

2003/0204599 A1* 10/2003 Trossen et al. .............. 709/227
2004/0143428 A1* 7/2004 Rappaport et al. ............ 703/22
2004/0236547 A1* 11/2004 Rappaport et al. ............. 703/2

* cited by examiner

| MetricService ~ 204 | DML ~ 202 | ActionService ~ 217 |
|---|---|---|
| createMetrics() ~ 562 | MetricService ~ 552<br>MetricRangeService ~ 558<br>CommService ~ 554<br>ActionService ~ 560<br>DeviceService ~ 556<br>VectorService ~ 559<br>MetricSpaceService ~ 561<br>DynamicActionListService ~ 563<br>Start() ~ 557 | createMetricActionList()<br>564 |

| DeviceService ~ 218 |
|---|
| createDeviceList() ~ 570 |

| MetricVectorService ~ 207 |
|---|
| createVectorObject()<br>565 |

| Metric ~ 206 |
|---|
| UserID ~ 486<br>MetricID ~ 488<br>Value ~ 490<br>MetricActionList ~ 622 |

| MetricRangeService ~ 208 |
|---|
| createRange() ~ 572 |

| MetricSpaceService ~ 209 |
|---|
| createMetricSpace() ~ 567 |

| Metric Vector ~ 606 |
|---|
| UserID ~ 486<br>Metric List ~ 652<br>DynamicActionList ~ 626<br>start() ~ 495 |

| CommService ~ 219 |
|---|
| createCommsObject() ~ 574 |

| Dynamic Action List Service ~ 211 |
|---|
| createDynamicList()<br>569 |

| Metric Space ~ 610 |
|---|
| SpaceID ~ 908<br>UserID ~ 405<br>RangeList ~ 655 |

| DomainStateService ~ 929 |
|---|
| createDomainStateOjbect() ~ 927 |

| Device ~ 214 |
|---|
| DeviceID ~ 472<br>commObj ~ 478<br>address ~ 480<br>attrribute ~ 481<br>getAtr() ~ 474<br>setAtr() ~ 476 |

| Action ~ 216 |
|---|
| ActionID ~ 450<br>ActionDescription ~ 317<br>deviceList ~ 458<br>doAction() ~ 456<br>createDeviceStateObject () ~ 911 |

| Comms ~ 215 |
|---|
| Send() ~ 482<br>Receive() ~ 484 |

| Metric Range ~ 210 |
|---|
| RangeID ~ 463<br>UserID ~ 464<br>MetricID ~ 462<br>Max ~ 468<br>Min ~ 470<br>getMin() ~ 471<br>getMax() ~ 473 |

| Domain State Object ~ 914 |
|---|
| MetricVector ~ 606<br>MetricSpace ~ 610<br>DeviceStateObject ~ 926 |

| Current Device State Object ~ 926 |
|---|
| DeviceAttributeTable ~ 927<br>add() ~ 921 |

FIG. 3

ADMINISTERING DEVICES WITH DOMAIN STATE OBJECTS

BACKGROUND OF THE INVENTION

1. Field of the Invention

The field of the invention is data processing, or, more specifically, methods, systems, and products for administering devices.

2. Description of Related Art

Conventional networks contain various devices. A user often uses the various devices, or adjusts the particular settings of the devices in dependence upon the user's current condition. That is, a user's current condition often motivates the user to change the settings of devices so that the devices operate in a manner that more positively benefits the user's current condition. For example, a user with a headache may be disturbed by a powerful light. The user may dim the light, or turn the light off, so that the light no longer disturbs the user. Conventional networked devices, however, require user intervention to individually administer the specific device in response to user condition. It would be advantageous if there were a method of administering devices in dependence upon user condition that did not require user intervention.

SUMMARY OF THE INVENTION

Exemplary embodiments of the present invention include a method for administering devices. Such exemplary embodiments include receiving a domain state object, identifying an action in dependence upon the domain state object, and executing the action. In many exemplary embodiments, receiving a domain state object includes receiving a signal to download the domain state object from a mobile sensor, and downloading the domain state object from the mobile sensor.

In some exemplary embodiments, receiving the domain state object includes receiving an address of the domain state object from a mobile sensor, and downloading the domain state object from the address. In many exemplary embodiments of the present invention, identifying an action in dependence upon the domain state object includes retrieving a current device state object from the domain state object, and selecting an action ID in dependence upon the current device state object.

Many embodiments include creating a second domain metric vector for the second domain in dependence upon the domain state object. Many embodiments also include creating a second domain metric action list in dependence upon the domain state object. Some embodiments include selecting a second domain user metric space in dependence upon the domain state object.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 3 is a block diagram illustrating exemplary classes useful in implementing methods for administering devices in accordance with the present invention.

DETAILED DESCRIPTION OF EXEMPLARY EMBODIMENTS

Introduction

Figure 1:
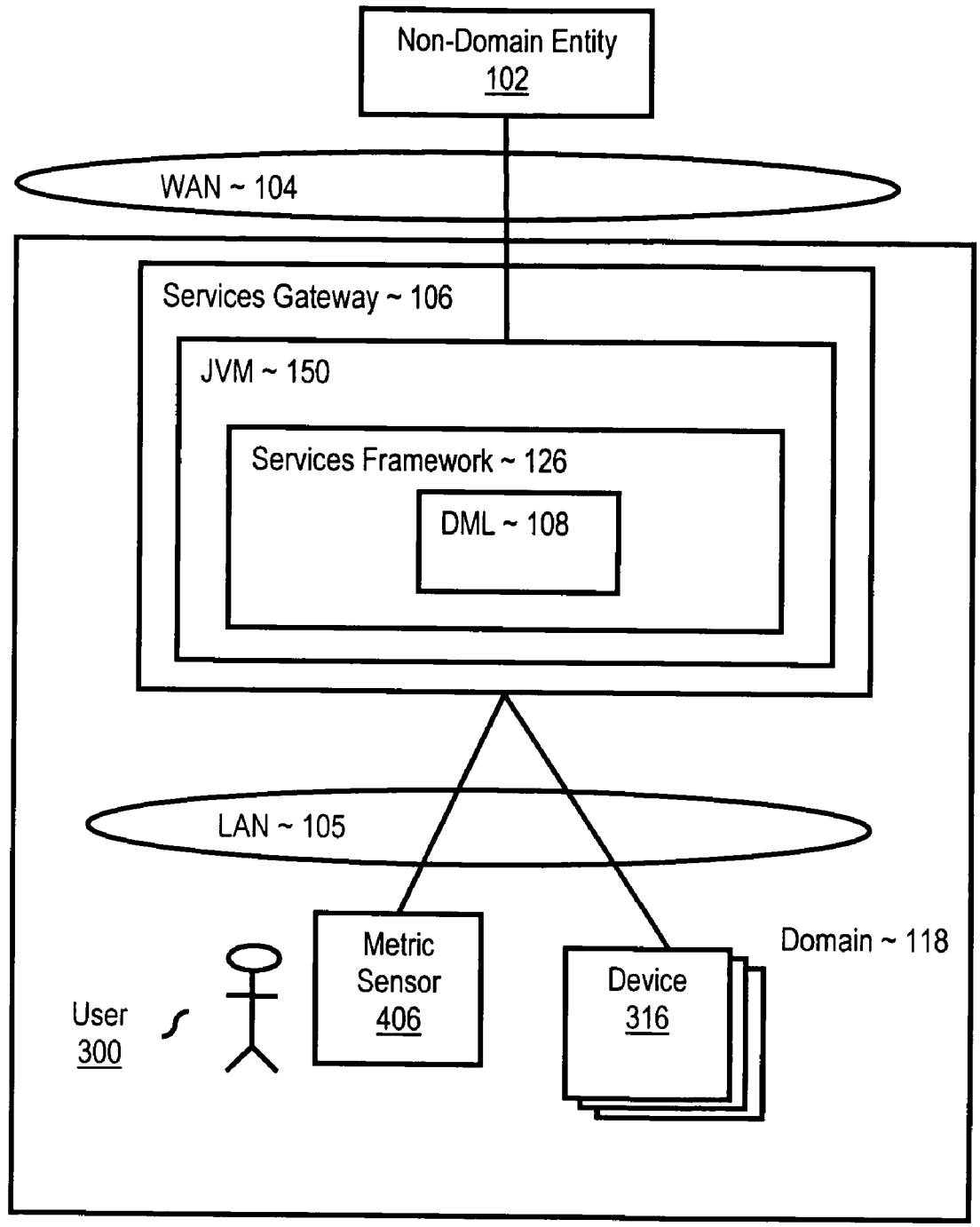
FIG. 1 is a block diagram illustrating an exemplary architecture useful in implementing methods for administering devices in accordance with the present invention.

The present invention is described to a large extent in this specification in terms of methods for administering devices. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"802.11" refers to a family of specifications developed by the IEEE for wireless LAN technology. 802.11 specifies an over-the-air interface between a wireless client and a base station or between two wireless clients.

"API" is an abbreviation for "application programming interface." An API is a set of routines, protocols, and tools for building software applications.

"Bluetooth" refers to an industrial specification for a short-range radio technology for RF couplings among client devices and between client devices and resources on a LAN or other network. An administrative body called the Bluetooth Special Interest Group tests and qualifies devices as Bluetooth compliant. The Bluetooth specification consists of a 'Foundation Core,' which provides design specifications, and a 'Foundation Profile,' which provides interoperability guidelines.

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"Driver" means a program that controls a device. A device (printer, disk drive, keyboard) typically has a driver. A driver acts as translator between the device and software programs that use the device. Each device has a set of specialized commands that its driver knows. Software programs generally access devices by using generic commands. The driver, therefore, accepts generic commands from a program and then translates them into specialized commands for the device.

"DTMF" is an abbreviation for Dual Tone Multi-Frequency. DTMF systems transmit signals across existing power lines, telephone lines, or wirelessly by assigning a tone of a particular frequency to each key of a touch-tone key pad at the signal's origin and converting the tone to a value at the signal's destination. Many such DTMF systems include a DTMF encoder at the origin that creates the predetermined tone when a particular key of the DTMF keypad is invoked and a DTMF decoder that converts the tone to a value at the destination.

The signal generated by a DTMF encoder is a summation of the amplitudes of two sine waves of different frequencies. In typical DTMF systems, each row of keys on a key pad is assigned a low tone. The first row of a key pad (keys 1, 2, and 3) is typically assigned a low tone of 697 Hz. The second row of a key pad (keys 4, 5, and 6) is typically assigned a low tone of 770 Hz. The third row of a key pad (keys 7, 8, and 9) is typically assigned a low tone of 852 Hz. The fourth row of a key pad (keys \*, 0, and #) is typically assigned a low tone of 491 Hz.

Each column of keys on the keypad is assigned a high tone. The first column of a key pad (keys 1, 4, 7, and \*) is typically assigned a high tone of 1209 Hz. The second column of a key pad (keys 2, 5, 8, and 0) is typically assigned a high tone of 1336 Hz. The third column of a key pad (keys 3, 6, 9, and #) is typically assigned a high tone of 1477 Hz.

Pressing a key of a DTMF system's key pad results in the summation of the particular key's low tone (assigned by the row in which the key resides) with the particular key's high tone (assigned by the column in which the key resides). For example, pressing '1' on a typical DTMF keypad results in a tone created by adding 1209 Hz and 697 Hz. The particular frequencies of the low tones and high tones have been chosen to reduce harmonics when the high tones and the low tones are added.

Many DTMF systems are currently available. For example, off-the-shelf DTMF systems are available from Silicon Systems, Inc., Arkady Horak-Systems, and Mitel Corp. All such DTMF systems can be advantageously used with various embodiments of the methods for administering devices in accordance with the present invention.

"ESN" is an abbreviation for "Electronic Serial Number." An ESN is a serial number programmed into a device, such as, for example, a coffeepot, to uniquely identify the device.

"Field"—In this specification, the terms "field" and "data element," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases." Complex data structures that include member methods, functions, or software routines as well as data elements are referred to as "classes." Instances of classes are referred to as "objects" or "class objects."

"HAVi" stands for 'Home Audio Video interoperability,' the name of a vendor-neutral audio-video standard particularly for home entertainment environments. HAVi allows different home entertainment and communication devices (such as VCRs, televisions, stereos, security systems, and video monitors) to be networked together and controlled from one primary device, such as a services gateway, PC, or television. Using IEEE 1394, the 'Firewire' specification, as the interconnection medium, HAVi allows products from different vendors to comply with one another based on defined connection and communication protocols and APIs. Services provided by HAVi's distributed application system include an addressing scheme and message transfer, lookup for discovering resources, posting and receiving local or remote events, and streaming and controlling isochronous data streams.

"HomePlug" stands for The HomePlug Powerline Alliance. HomePlug is a not-for-profit corporation formed to provide a forum for the creation of open specifications for high speed home powerline networking products and services. The HomePlug specification is designed for delivery of Internet communications and multimedia to homes through the home power outlet using powerline networking standards.

The HomePlug protocol allows HomePlug-enabled devices to communicate across powerlines using Radio Frequency signals (RF). The HomPlug protocol uses Orthogonal Frequency Division Multiplexing (OFDM) to split the RF signal into multiple smaller sub-signals that are then transmitted from one HomPlug enabled-device to another HomePlug-enabled device at different frequencies across the powerline.

"HTTP" stands for 'HyperText Transport Protocol,' the standard data communications protocol of the World Wide Web.

"ID" abbreviates "identification" as used by convention in this specification with nouns represented in data elements, so that 'user ID' refers to a user identification and 'userID' is the name of a data element in which is stored a user identification. For a further example of the use of 'ID': 'metric ID' refers to a metric identification and 'metricID' is the name of a data element in which is stored a metric identification.

"IEEE 1394" is an external bus standard that supports data transfer rates of up to 400 Mbps (400 million bits per second). Apple, which originally developed IEEE 1394, uses the trademarked name "FireWire." Other companies use other names, such as i.link and Lynx, to describe their 1394 products.

A single 1394 port can be used to connect up to 63 external devices. In addition to high speed, 1394 also supports isochronous data transfer—delivering data at a guaranteed rate. This makes it ideal for devices that need to transfer high levels of data in real-time, such as video.

"The Internet" is a global network connecting millions of computers utilizing the 'internet protocol' or 'IP' as the network layer of their networking protocol stacks. The Internet is decentralized by design. Each computer on the Internet is independent. Operators for each computer on the Internet can choose which Internet services to use and which local services to make available to the global Internet community. There are a variety of ways to access the Internet. Many online services, such as America Online, offer access to some Internet services. It is also possible to gain access through a commercial Internet Service Provider (ISP). An "internet" (uncapitalized) is any network using IP as the network layer in its network protocol stack.

"JAR" is an abbreviation for 'Java archive.' JAR is a file format used to bundle components used by a Java application. JAR files simplify downloading applets, because many components (.class files, images, sounds, etc.) can be packaged into a single file. JAR also supports data compression, which further decreases download times. By convention, JAR files end with a '.jar' extension.

"JES" stands for Java Embedded Server. JES is a commercial implementation of OSGi that provides a framework for development, deployment, and installation of applications and services to embedded devices.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

"LonWorks" is a networking platform available from Echelon®. Lon Works is currently used in various network applications such as appliance control and lighting control. The LonWorks networking platform uses a protocol called "LonTalk" that is embedded within a "Neuron Chip" installed within Lon Works-enabled devices.

The Neuron Chip is a system-on-a-chip with multiple processors, read-write and read-only memory (RAM and ROM), and communication and I/O subsystems. The read-only memory contains an operating system, the LonTalk protocol, and an I/O function library. The chip has non-volatile memory for configuration data and for application programs, which can be downloaded over a LonWorks network to the device. The Neuron Chip provides the first 6 layers of the standard OSI network model. That is, the Neuron Chip provides the physical layer, the data link layer, the network layer, the transport layer, the session layer, and the presentation layer.

The Neuron Chip does not provide the application layer programming. Applications for LonWorks networks are written in a programming language called "Neuron C." Applications written in Neuron C are typically event-driven, and therefore, result in reduced traffic on the network.

"OSGI" refers to the Open Services Gateway Initiative, an industry organization developing specifications for services gateways, including specifications for delivery of service bundles, software middleware providing compliant data communications and services through services gateways. The Open Services Gateway specification is a java based application layer framework that gives service providers, network operator device makers, and appliance manufacturer's vendor neutral application and device layer APIs and functions.

The "OSI Model" or Open System Interconnection, model defines a networking framework for implementing protocols in seven layers. Control is passed from one layer to the next, starting at the application layer in one network station, proceeding to the bottom layer, over the channel to the next network station and back up the hierarchy.

The seventh layer of the OSI model is the application layer. The application layer supports application and end-user processes. The application layer provides application services for file transfers, email, and other network software services.

The sixth layer of the OSI model is the presentation layer. The presentation layer provides independence from differences in data representation. The presentation layer translates from application data format to network data format, and vice versa. The presentation layer is sometimes called the "syntax layer."

The fifth layer of the OSI model is the session layer. The session layer establishes, manages, and terminates connections between networked applications. The session layer sets up, coordinates, and terminates conversations, exchanges, and dialogues between networked applications.

The fourth layer of the OSI model is the transport layer. The transport layer provides transparent transfer of data between networked systems, or hosts. The transport layer is also responsible for flow control and ensures complete data transfer.

The third layer of the OSI model is the network layer. The network layer creates logical paths, known as virtual circuits, for transmitting data from one network node to another network node. Routing, forwarding, addressing, and packet sequencing are functions of the network layer.

The second layer of the OSI model is the data link layer. The data link layer decodes data packets into bits and codes bits into data packets. The data link layer provides a transmission protocol and manages data flow transmission in the in the physical layer.

The data link layer is divided into two sublayers. The first sublayer of the data link layer is the Media Access Control (MAC) layer. The MAC sublayer controls access and permission for a computer on a network to transmit data. The second sublayer of the data link layer is the Logical Link Control (LLC) layer. The LLC layer controls data flow transmission in the physical layer.

The first layer of the OSI model is the physical layer. The physical layer transmits the bit stream (electrical impulse, light or radio signal) through the physical network at the electrical and mechanical level. The physical layer provides the hardware for sending and receiving data.

"SMF" stands for "Service Management Framework™" available from IBM®. SMF is a commercial implementation of OSGi for management of network delivered applications on services gateways.

"USB" is an abbreviation for "universal serial bus." USB is an external bus standard that supports data transfer rates of 12 Mbps. A single USB port can be used to connect up to 127 peripheral devices, such as mice, modems, and keyboards. USB also supports Plug-and-Play installation and hot plugging.

"WAP" refers to the Wireless Application Protocol, a protocol for use with handheld wireless devices. Examples of wireless devices useful with WAP include mobile phones, pagers, two-way radios, and hand-held computers. WAP supports many wireless networks, and WAP is supported by many operating systems. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

The "X-10" means the X-10 protocol. Typical X-10 enabled devices communicate across AC powerline wiring, such as existing AC wiring in a home, using an X-10 transmitter and an X-10 receiver. The X-10 transmitter and the X-10 receiver use Radio Frequency (RF) signals to exchange digital information. The X-10 transmitter and the X-10 receiver communicate with short RF bursts which represent digital information. A Binary 1 is represented by a 1 millisecond burst of 120 KHz. and a Binary 0 by the absence of 120 KHz burst followed by the presence of a burst.

In the X-10 protocol, data is sent in data strings called frames. The frame begins with a 4 bit start code designated as "1110." Following the start code, the frame identifies a particular domain, such as house, with a 4 bit "house code," and identifies a device within that domain with a 4 bit "devices code." The frame also includes a command string of 8 bits identifying a particular preset command such as "on," "off," "dim," "bright," "status on," "status off," and "status request."

"XML" stands for 'eXtensible Markup Language,' a language that support user-defined markup including user-defined elements, tags, and attributes. XML's extensibility contrasts with most web-related markup languages, such as HTML, which are not extensible, but which instead use a standard defined set of elements, tags, and attributes. XML's extensibility makes it a good foundation for defining other languages. WML, the Wireless Markup Language, for example, is a markup language based on XML. Modem browsers and other communications clients tend to support markup languages other than HTML, including, for example, XML.

Exemplary Architecture

FIG. 1 is a block diagram of exemplary architecture useful in implementing methods of administering devices in accordance with embodiments of the present invention. The architecture of FIG. 1 includes a domain (118). The term "domain" in this specification means a particular networked environment. Examples of various domains include home networks, car networks, office network, and others as will occur to those of skill in the art.

The domain (118) of FIG. 1 includes a services gateway (106). A services gateway (106) is, in some exemplary architectures, an OSGi compatible services gateway (106). While exemplary embodiments of methods for administering devices are described in this specification using OSGi, many other applications and frameworks, will work to implement the methods of administering devices according to the present invention, and are therefore also well within the scope of the present invention. Commercial implementations of OSGi, such as JES and SMF, are also useful in implementing methods for administering devices.

In the exemplary architecture of FIG. 1, the services gateway (126) includes a services framework (126). The services framework (126) of FIG. 1 is a hosting platform for running 'services.' Services are the main building blocks for creating applications in the OSGi. An OSGi services framework (126) is written in Java and therefore, typically runs on a Java Virtual Machine (JVM) (150).

The exemplary architecture of FIG. 1 includes a DML (108). "DML" (108) is an abbreviation for Domain Mediation Layer. In many embodiments of the architecture of FIG. 1, the DML (108) is application software useful in implementing methods of administering devices in accordance with the present invention. In some embodiments of the present invention, the DML is OSGi compliant application software, and is therefore implemented as a service or a group of services packaged as a bundle installed on the services framework (126). In this specification, DMLs are often discussed in the context of OSGi. However, the discussion of OSGI is for explanation and not for limitation. In fact, DMLs according to various embodiments of the present invention can be implemented in any programming language, C, C++, COBOL, FORTRAN, BASIC, and so on, as will occur to those of skill in the art, and DMLs developed in languages other than Java are installed directly upon an operating system or operating environment rather than a JVM.

In the exemplary architecture of FIG. 1, the services gateway (106) is coupled for data communications with a metric sensor (406). A metric sensor (406) is a device that reads an indication of a user's condition, and creates a user metric in response to the indication of the user's condition. An "indication of a user's condition" is a quantifiable aspect of a user's condition and a quantity measuring the aspect. For example, a quantifiable aspect of a user's condition is a body temperature of 99.2 degrees Fahrenheit. Examples of quantifiable aspects of a user's condition include body temperature, heart rate, blood pressure, location, galvanic skin response, and others as will occur to those of skill in the art.

A "user metric" is a data structure representing an indication of user condition. In many examples of methods for administering devices in accordance with the present invention, a user metric is implemented as a data structure, class, or object that includes a userID field, a metricID field, and a metric value field. A typical userID field identifies the user whose indication of condition is represented by the metric. A typical metricID field identifies the quantifiable aspect of user condition the metric represents, such as, for example, blood pressure, heart rate, location, or galvanic skin response. A typical metric value field stores a quantity measuring the aspect of a user's condition.

Wearable and wireless heart rate monitors, galvanic skin response monitors, eye response monitors, and breathing monitors useful as or easily adaptable for use as metric sensors are currently available from Quibit Systems, Inc. The 'Polar' series of heart rate monitors from Body Trends, Inc., and the magnetoelastic gastric pH sensors from Sentec Corporation are other examples of readily available biomedical sensors useful as or easily adaptable for use as metric sensors.

In order for a conventional sensor, such as a biomedical sensor, to be useful as a metric sensor that transmits multiple metric types in a domain containing multiple users, the sensor advantageously transmits not only a value of the each aspect it measures, but also transmits a user ID and a metricID. The user ID is useful because typical embodiments of the present invention include a DML capable of administering devices on behalf of many users simultaneously. The metricID is useful because a single user may employ more than one metric sensor at the same time or employ a metric sensor capable of monitoring and transmitting data regarding more than one aspect of user condition. All wireless sensors at least transmit a metric value according to some wireless data communications protocol. To the extent that any particular sensor 'off-the-shelf' does not also transmit user ID or metricID, such a sensor is easily adapted, merely by small modifications of its controlling software, also to include in its transmissions user IDs and metricID.

Although it is expected that most DMLs will support metric IDs and user IDs, it is possible, under some circumstances within the scope of the present invention, to use an off-the-shelf sensor as a metric sensor even if the sensor does not provide metric ID and user ID in its output telemetry. Consider an example in which only a single person inhabits a domain having device controlled or administered by a DML tracking only a single metric, such as, for example, heart rate. A DML tracking only one metric for only one user could function without requiring a metric type code in telemetry received from the metric sensor because, of course, only one type of metric is received. In this example, strictly speaking, it would be possible for an off-the-shelf, Bluetooth-enabled heart rate sensor, such as a 'Polar' sensor from Body Trends, to function as a metric sensor. This example is presented only for explanation, because as a practical matter it is expected that most DMLs according to embodiments of the present invention will usefully and advantageously administer more than one type of metric (therefore needing a metric ID code in their telemetry) on behalf of more than one user (therefore needing a user ID in their telemetry).

In many embodiments of the present invention, the metric sensor is advantageously wirelessly coupled for data communications with the services gateway (106). In many alternative embodiments, the metric sensor transmits the user metric to the DML through a services gateway using various protocols such as Bluetooth, 802.11, HTTP, WAP, or any other protocol that will occur to those of skill in the art.

In the exemplary architecture of FIG. 1, the domain (118) includes a device (316) coupled for data communications with the services gateway (106) across a LAN (105). In many embodiments of the present invention, a domain (118) will include many devices. A home domain, for example, may include a home network having a television, numerous lights, a refrigerator, a freezer, a coffee pot, a dishwasher, a dryer, a CD player, a DVD player, a personal video recorder, or any other networkable device that will occur to those of skill in the art. For ease of explanation, the exemplary architecture of FIG. 1 illustrates only three devices (316), but the use of any number of devices is well within the scope of the present invention.

To administer the device (316), the DML must have the device class for the device containing accessor methods that get and set attributes on the device, and in some cases, a communication class that provides the protocols needed to communicate with the device. In some examples of the architecture of FIG. 1, a DML has pre-installed upon it, device classes and communications classes for many devices that the DML supports.

To the extent the DML does not have a preinstalled device class and communications class for a particular device, the DML can obtain the device class and communications class in a number of ways. One way the DML obtains the device class and communications class for the device is by reading the device class and the communications class from the device. This requires the device have enough installed memory to store the device class and communications class. The DML can also obtain the device class and communications class from devices that do not contain the device class or communications class installed upon them. One way the DML obtains the device class and communications class is by reading a device ID from the device, searching the Internet for the device class and communications class, and downloading them. Another way the DML obtains the device class and communications class is by reading a network location from the device downloading, from the network location, the device class and communications class. Three ways have been described for obtaining the device classes and communications classes needed to administer devices in accordance with the present invention. Other methods will also occur to those of skill in the art.

The exemplary architecture of FIG. 1 includes a non-domain entity (102) that is coupled for data communications with the services gateway (106) across a WAN (104). A "non-domain entity" is any computing device or network location coupled for data communications to the domain but not within the domain. The phrase "non-domain entity" is broad and its inclusion in the architecture of FIG. 1 acknowledges that in many embodiments of architecture useful in implementing methods of administering devices in accordance with the present invention, a given domain is coupled for data communications with outside non-domain entities.

An example of a non-domain entity is a web server (outside the domain) of a manufacturer of the device (316) installed within the domain. The manufacturer may operate a website that makes available for download drivers for the device, updates for the device, or any other information or software for the device. Drivers, updates, information or software for the device are downloadable to the device across a WAN and through the services gateway.

Figure 2:
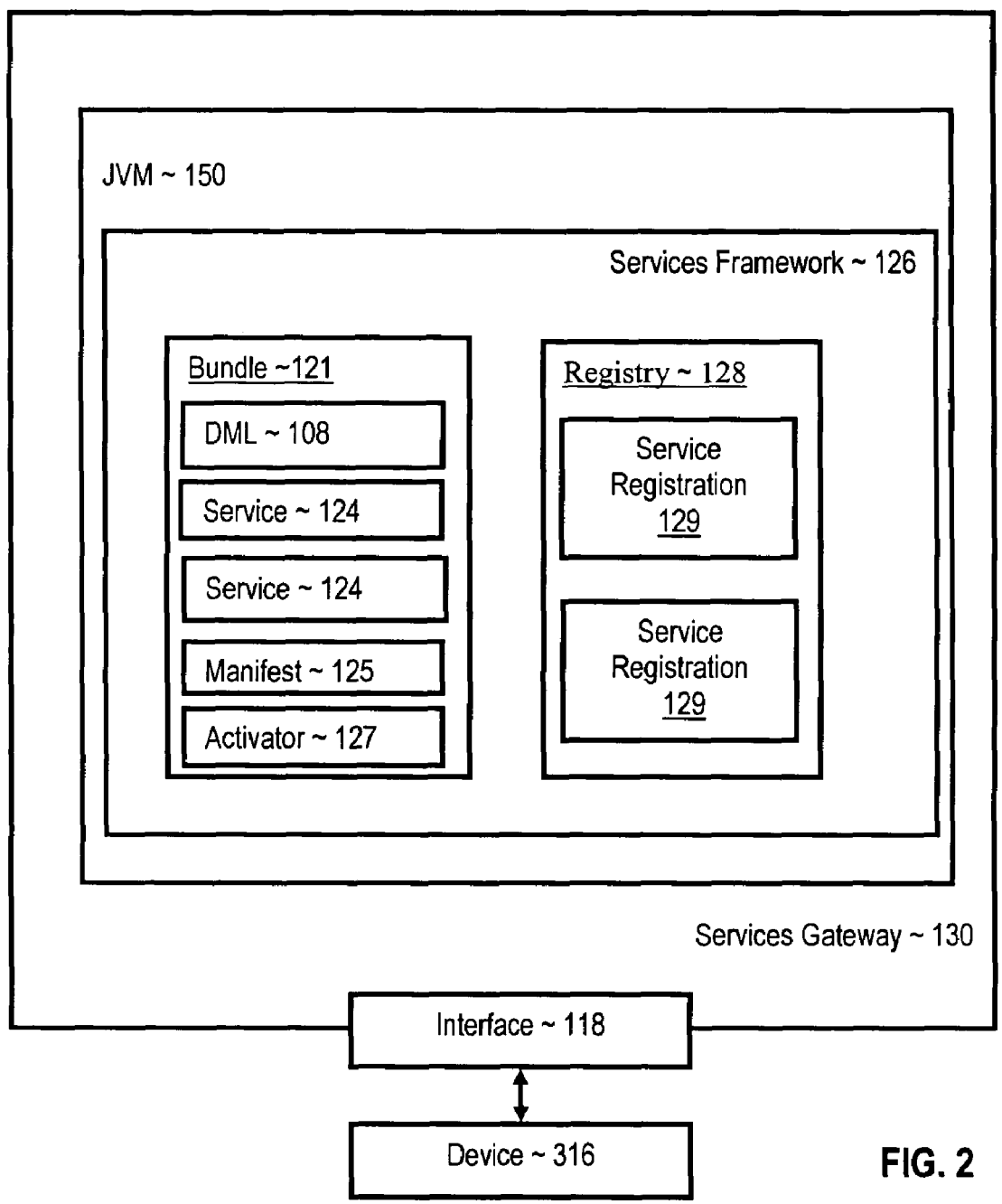
FIG. 2 is a block diagram illustrating an exemplary services gateway.

FIG. 2 is a block diagram of an exemplary services gateway (106) useful in implementing methods of administering devices according to the present invention. The services gateway (106) of FIG. 2 is, in some exemplary architectures useful in embodiments of the present invention, an OSGi compatible services gateway (106). While exemplary embodiments of methods for administering a device are described in this specification using OSGi, many other applications and frameworks other than OSGi will work to implement methods of administering devices according to the present invention and are therefore well within the scope of the present invention. Commercial implementations of OSGi, such as JES and SMF, are also useful in implementing methods of the present invention.

OSGi Stands for 'Open Services Gateway Initiative.' The OSGi specification is a Java-based application layer framework that provides vendor neutral application and device layer APIs and functions for various devices using arbitrary communication protocols operating in networks in homes, cars, and other environments. OSGi works with a variety of networking technologies like Ethernet, Bluetooth, the 'Home, Audio and Video Interoperability standard' (HAVi), IEEE 1394, Universal Serial Bus (USB), WAP, X-10, Lon Works, HomePlug and various other networking technologies. The OSGi specification is available for free download from the OSGi website at www.osgi.org.

The services gateway (130) of FIG. 2 includes a service framework (126). In many example embodiments the service framework is an OSGi service framework (126). An OSGi service framework (126) is written in Java and therefore, typically runs on a Java Virtual Machine (JVM). In OSGi, the service framework (126) of FIG. 1 is a hosting platform for running 'services' (124). The term 'service' or 'services' in this disclosure, depending on context, generally refers to OSGi-compliant services.

Services (124) are the main building blocks for creating applications according to the OSGi. A service (124) is a group of Java classes and interfaces that implement a certain feature. The OSGi specification provides a number of standard services. For example, OSGi provides a standard HTTP service that creates a web server that can respond to requests from HTTP clients.

OSGi also provides a set of standard services called the Device Access Specification. The Device Access Specification ("DAS") provides services to identify a device connected to the services gateway, search for a driver for that device, and install the driver for the device.

Services (124) in OSGi are packaged in 'bundles' (121) with other files, images, and resources that the services (124) need for execution. A bundle (121) is a Java archive or 'JAR' file including one or more service implementations (124), an activator class (127), and a manifest file (125). An activator class (127) is a Java class that the service framework (126) uses to start and stop a bundle. A manifest file (125) is a standard text file that describes the contents of the bundle (121).

In the exemplary architecture of FIG. 2 includes a DML (108). In many embodiments of the present invention, the DML is an OSGi service that carries out methods of administering devices. The DML (108) of FIG. 2 is packaged within a bundle (121) and installed on the services framework (126).

The services framework (126) in OSGi also includes a service registry (128). The service registry (128) includes a service registration (129) including the service's name and an instance of a class that implements the service for each bundle (121) installed on the framework (126) and registered with the service registry (128). A bundle (121) may request services that are not included in the bundle (121), but are registered on the framework service registry (128). To find a service, a bundle (121) performs a query on the framework's service registry (128).

Exemplary Classes and Class Cooperation

FIG. 3 is a block diagram illustrating exemplary classes useful in implementing methods for administering devices in accordance with the present invention. The exemplary classes of FIG. 3 are presented as an aid to understanding of the present invention, not for limitation. While methods of administering devices in accordance with the present invention are discussed generally in this specification in terms of Java, Java is used only for explanation, not for limitation. In fact, methods of administering devices in accordance with the present invention can be implemented in many programming languages including C++, Smalltalk, C, Pascal, Basic, COBOL, Fortran, and so on, as will occur to those of skill in the art.

The class diagram of FIG. 3 includes an exemplary DML class (202). An instance of the exemplary DML class (202) of FIG. 3 provides member methods that carry out the steps useful in administering devices in accordance with the present invention. The exemplary DML class of FIG. 3 is shown with an Activator.start( ) method so that the DML can be started as a service in an OSGi framework. Although only one member method is shown for this DML, DMLs in fact will often have more member methods as needed for a particular embodiment. The DML class of FIG. 3 also includes member data elements for storing references to services classes, often created by the DML's constructor. In this example, the DML provides storage fields for references to a metric service (552), a metric range service (558), a communication service (554), an action service (560), a device service (556), a metric vector service (559) and a metric space service (561), and dynamic action list service (563).

The metric service class (204) of FIG. 3 provides member methods that receive user metrics from a DML and create, in response to receiving the user metrics from the DML, an instance of a metric class. The metric service class (204) of FIG. 3 includes a createMetric(UserID, MetricID, MetricValue) member method (562). The createMetric( ) member method is, in some embodiments, a factory method parameterized with a metric ID that creates and returns a metric object in dependence upon the metric ID. In response to getting a user metric from the DML, the exemplary instance of the metric service class (204) of FIG. 3 creates an instance of a metric class and returns to the DML a reference to the new metric object.

Strictly speaking, there is nothing in the limitations of the present invention that requires the DML to create metric object through a factory method. The DML can for example proceed as illustrated in the following pseudocode segment:

```
// receive on an input stream a metric message
// extract from the metric message a userID,
// a metric ID, and a metric value, so that:
int userID = // userID from the metric message
int metricID = // metricID from the metric message
int metricValue = // metric value from the metric message
Metric aMetric = new Metric( );
aMetric.setUserID (userID);
aMetric.setMetricID(metricID);
aMetric.setMetricValue(metricValue);
aMetric.start ( );
```

This example creates a metric object and uses accessor methods to load its member data. This approach provides exactly the same class of metric object for each metric, however, and there are circumstances when metrics advantageously utilize different concrete class structures. In the case of metrics for heart rate and blood pressure, for example, both metric values may be encoded as integers, where a metric value for polar coordinates on the surface of the earth from a GPS transceiver, for example, may advantageously be encoded in a more complex data structure, even having its own Location class, for example. Using a factory method eases the use of more than one metric class. A DML using a factory method to create metric objects can proceed as illustrated in the following exemplary pseudocode segment:

```
// receive on an input stream a metric message
// extract from the metric message a userID,
// a metric ID, and a metric value, so that:
int userID = // userID from the metric message
int metricID = // metricID from the metric message
int metricValue = // metric value from the metric message
Metric aMetric = MetricService.createMetricObject(userID, metricID,
    metricValue);
aMetric.start( );
```

This example relies on the factory method createMetric( ) to set the parameter values into the new metric object. A metric service and a factory method for metric object can be implemented as illustrated in the following pseudocode segment:

```
//
// Metric Service Class
//
class MetricService
{
    public static Metric createMetricObject(userID, metricID,
    metricValue)
    {
        Metric aMetric;
        switch(metricID)
        {
            case 1: aMetric = new HeartRateMetric(userID, metricID,
                metricValue);
                break;
            case 2: aMetric =
                new BloodPressureMetric(userID, metricID,
                metricValue);
                break;
            case 3: aMetric = new GPSMetric(userID, metricID
                metricValue);
                break;
        } // end switch( )
        return aMetric;
    } // end createMetric( )
} // end class MetricService
```

MetricService in this example implements a so-called parameterized factory design pattern, including a factory method. In this example, the factory method is a member method named 'createMetricObject( ).' CreateMetricObject( ) accepts three parameters, a user ID, a metric ID, and a metric value. CreateMetricObject( ) implements a switch statement in dependence upon the metric ID to select and instantiate a particular concrete metric class. The concrete metric classes in this example are HeartRateMetric, BloodPressureMetric, and GPSMetric, each of which extends a Metric base class. CreateMetricObject( ) returns to the calling DML a reference to a new metric object. The call from the DML: Metric aMetric=MetricService.createMetricObject(userID, metricID, metricValue); is polymorphic, utilizing a reference to the base class Metric, so that the calling DML neither knows nor cares which class of metric object is actually instantiated and returned. The following is an example of extending a Metric base class to define a concrete metric class representing a user's location on the surface of the earth extending a Metric base class:

```
Class GPSMetric extends Metric {
    int myUserID;
    int myMetricID
    class GPSLocation {
        Latitude myLatitude;
        Longitude myLongitude;
    }
    Class Latitude {
        String direction;
        int degrees;
        int minutes;
        int seconds;
    }
    Class Longitude {
        String direction;
        int degrees;
        int minutes;
        int seconds;
    }
    GPSLocation myLocation;
    GPSMetric(int userID, int metricID GPSLocation metricValue) {
        myUserID = userID;
        myMetricID = metricID:
        myLocation = metricValue;
    }
}
```

The example concrete class GPSMetric provides storage for latitude and longitude. GPSMetric provides a constructor GPSMetric( ) that takes integer arguments to set userID and metricID but expects its metricValue argument to be a reference to a GPSLocation object, which in turn provides member data storage for latitude and longitude.

The class diagram of FIG. 3 includes an exemplary metric class (206). The exemplary metric class (206) of FIG. 3 represents a user metric. A user metric comprises data describing an indication of user condition. An indication of a user's condition is a quantifiable aspect of a user's condition and a quantity measuring the aspect. Examples of quantifiable aspects of a user's condition include body temperature, heart rate, blood pressure, location, galvanic skin response, or any other aspect of user condition as will occur to those of skill in the art.

The exemplary metric class (206) of FIG. 3 includes a user ID field (486), a metric ID field (488), a value field (490). The user ID field (486) identifies the user. The metric ID (488) field identifies the user metric that an instance of the metric class represents. That is, the kind of user metric. The value field (490) includes a value of the user metric.

The exemplary metric class of FIG. 3 also includes data storage for a metric action list (622). A metric action list is a data structure containing action IDs identifying actions that when executed administer devices in a manner that affect the same aspect of user condition represented by the metric. A metric for body temperature, for example, may have an associated metric action list including an action ID that when executed results in turning on a ceiling fan. In many examples of methods for administering devices, the action IDs in the metric action lists are used to identify action IDs for inclusion in a dynamic action list.

This exemplary metric class (206) is an example of a class that can in various embodiments be used in various embodiments as a generic class, instances of which can be used to store or represent more than one type of metric having identical or similar member data elements as discussed above. Alternatively in other embodiments, a class such as this example metric class (206) can be used as a base class to be extended by concrete derived classes each of which can have widely disparate member data type, also described above.

The class diagram of FIG. 3 includes a metric vector service (207). The metric vector service class (207) of FIG. 3 provides member methods that create, in response to receiving the user metrics from the metric service, an instance of a metric vector class. In many example embodiments, the createMetric vectorObject( ) member method (565) identifies from a metric vector list a metric vector ID for the user metric vector in dependence upon the user ID, and the metric ID. If there is not a metric vector for the user and for that metric ID in the metric vector service's metric vector list, the metric vector service instantiates one and stores its metric vector ID in a metric vector table, indexed by the associated user ID and metric ID. Creating a metric vector object can be implemented as illustrated in the following pseudocode segment:

```
// receive a metric on input stream
// extract its userID as an integer
// instantiate a metric object
Metric newMetric = metricService.createMetricObject(metricID);
int MetricVectorID = 0;
if((MetricVectorID = MetricVectorList.get(userID, metricID)) == null) {
    MetricVector newMetricVector =
    MetricVectorService.createMetricVectorObject(userID, metricID);
    MetricVectorID = newMetricVector.MetricVectorID;
    MetricVectorList.add(MetricVectorID, newMetricVector)
}
```

In the pseudocode example above, if the metric vector service receives a metric having a userID for which it has no metric vector identified in the metric vector service's metric vector table, the metric vector service creates a new metric vector having a new metric vector ID for the user and adds the metric vector to the metric vector list.

The class diagram of FIG. 3 includes a metric vector class (606). Objects of the metric vector class represent a complex indication of user condition. A user metric vector typically includes a collection of a user metrics each representing a single quantifiable aspect of a user's condition and a quantity measuring the aspect. A user metric vector comprised of a plurality of disparate user metrics therefore represents a complex indication of user condition having multiple quantifiable aspects of a user's condition and multiple quantities measuring the aspects. The metric vector class (606) includes data elements for storing a user ID (486) identifying the user and a metric list (652) for storing references to a plurality of disparate metric objects.

The exemplary metric vector (606) of FIG. 3 also includes data storage for a dynamic action list (626). A dynamic action list is a list of action IDs created in dependence upon metric action lists that are associated with the particular metrics of the user metric vector that are outside their corresponding metric ranges of the user metric space. That is, each metric of the metric vector that is outside its corresponding metric range has an associated metric action list. A dynamic action list includes action IDs identified in dependence upon those metric action lists associated with the particular metrics of a user metric vector outside their corresponding metric ranges of the user metric space. A dynamic action list advantageously provides a list of action IDs tailored to the user's current condition.

Objects of the exemplary metric vector class also typically include member methods for determining if the metric vector is outside a user metric space. This exemplary metric vector class is an example of a class that can in various embodiments be used as a generic class, instances of which can be used to store or represent more than one type of vector having identical or similar member data elements. Alternatively in other embodiments, a class such as this example metric vector class can be used as a base class to be extended by concrete derived classes each of which can have disparate member data types.

The class diagram of FIG. 3 includes metric range service class (208). The metric range service class (208) provides member methods that instantiate an instance of a metric range class. The metric range service class (208) of FIG. 3 includes a createRangeObject(UserID, MetricID) member method (572). The createRangeObject( ) member method is a factory method parameterized with a userID and a metric ID that creates a metric range object in dependence upon the userID and metric ID. The createRangeObject( ) factory method returns a reference to the metric range object to the metric object. The createRangeObject( ) is a parameterized factory method that can be implemented using the same design patterns outlined by the exemplary psuedocode provided in the description of the createMetricObject( ) factory method.

The class diagram of FIG. 3 includes an exemplary metric range class (210). An instance of the exemplary metric range class represents a predefined metric range for a user for a metric. A maximum value and minimum value in a metric range object are compared with a metric value to determine whether the metric value of the metric object is outside a predefined metric range. The exemplary metric range class (210) of FIG. 3 includes range ID field (463) identifying the metric range, and a metric ID field (462) identifying the user metric. The exemplary metric range class (210) of FIG. 3 includes a user ID field (464) identifying the user. The metric range class also includes a Max field (468) and a Min field (470) containing a maximum value and a minimum value defining a metric range.

The exemplary metric range class (210) of FIG. 3 is an example of a so-called data object, that is, a class that serves only as a container for data, with little or no processing done on that data by the member methods of the class. In this example, objects of the metric range class are used primarily to transfer among other objects the minimum and maximum values of a metric range. The metric range class of FIG. 3 includes a default constructor (not shown), but strictly speaking, would need no other member methods. If the metric range class were provided with no other member methods, cooperating object could access its member data elements directly by coding, such as, for example: "someMetricRange-.max" or "someMetricRange.min." The particular example in this case (210), however, is illustrated as containing accessor methods (471, 473) for the minimum and maximum values of its range, a practice not required by the invention, but consistent with programming in the object oriented paradigm.

The class diagram of FIG. 3 includes a metric space service class (209). The metric space service class (209) includes a member method createMetricSpace( ) that searches a metric space list, or other data structure, to identify a metric space for a user. If no such metric space exists, createMetricSpace( ) instantiates one and stores the metric space ID in the metric space list. Creating a metric space object can be implemented by way of the following exemplary psuedocode:

```
// extract its userID and MetricVector ID as an integer
// instantiate a metric space object
MetricVector newMetricVector
    =MetricVectorService.createMetricVectorObject(userID,
      MetricVectorID);
if((spaceID = MetricSpaceList.get(userID,metric vectorID)) == null) {
MetricSpace newMetricSpace =
    MetricSpaceService.createMetricSpace(userID, MetricVectorID);
```

-continued

```
MetricSpaceID = newMetricSpace.SpaceID;
MetricSpaceList.add(SpaceID, newMetricSpace)
}
```

In the pseudo code example above, the metric space service searches a metric space list for a metric space. If the list contains no metric space for the userID and metric vector ID, then MetricSpaceService.createMetricSpace(userID, MetricVectorID) creates a new metric space with a new metric space ID.

The class diagram of FIG. 3 includes a metric space class. The user metric space is comprised of a plurality of user metric ranges for disparate metrics. The exemplary metric space includes data elements for storing a user ID (405) identifying the user and a space ID (908) identifying the metric space. The metric space (610) of FIG. 3 also includes data storage (655) for a list of references to disparate metric ranges for a user. The disparate metric ranges of the metric space correspond in kind to the metrics in the user metric vector. That is, in typical embodiments, the user metric vector includes a set of disparate current metrics and the user metric space includes a set of corresponding metric ranges for the user.

The class diagram of FIG. 3 includes an action service class (217). The action service class includes member methods that instantiate a metric action list for a metric, instantiate action objects store references to the action objects in the action list, and return to a calling metric a reference to the action list, all of which can be implemented as illustrated by the following exemplary pseudocode ActionService class:

```
//
// Action Service Class
//
class ActionService
{
    public static Action createActionList(userID, MetricID)
    {
        ActionList anActionList = new ActionList( );
        int actionID;
        // with finds of database action records storing data describing
        actions
        for(/* each action record matching userID and metricID */) {
            // obtain action ID from each matching action record
            actionID = // action ID from matching database record
            // * the action constructors below obtain from a device
            // service a list of devices administered by the action object
            switch(actionID)
            {
                case 1: Action anAction1 = new Action1
                    (DeviceService, actionID);
                    anActionList.add(anAction1);
                    break;
                case 2: Action anAction2 = new Action2
                    (DeviceService, actionID);
                    anActionList.add(anAction2);
                    break;
                case 3: Action anAction3 = new Action3
                    (DeviceService, actionID);
                    anActionList.add(anAction3);
                    break;
                case 4: Action anAction4 = new Action4
                    (DeviceService, actionID);
                    anActionList.add(anAction4);
                    break;
                case 5: Action anAction5 = new Action5
                    (DeviceService, actionID);
                    anActionList.add(anAction5);
                    break;
```

-continued

```
            } // end switch( )
        } // end for( )
        return anActionList;
    } // end createActionListObject( )
} // end class ActionService
```

The createActionList( ) method in ActionService class instantiates a metric action list for a user metric with "ActionList anActionList=new ActionList( )." CreateActionList( ) then searches an action record table in a database for records having user IDs and metric IDs matching its call parameters. For each matching record in the table, createActionList( ) instantiates an action object through its switch statement. The switch statement selects a particular concrete derived action class for each action ID retrieved from the action record table. CreateActionList( ) stores a references to each action object in the action list with "anActionList.add( )." CreateActionList( ) returns a reference to the action list with "return anActionList."

The class diagram of FIG. 3 includes an exemplary action class (216). An instance of the action class represents an action that when executed results in the administration of a device. The exemplary action class of FIG. 3 includes an action ID field (450). The doAction( ) method (456) in the exemplary action class (216) is programmed to obtain a device list (458) from, for example, a call to DeviceService.createDeviceList( ). Action.doAction( ) (456) typically then also is programmed to call interface methods in each device in its device list to carry out the device controlling action.

The class diagram of FIG. 3 includes a dynamic action list service. The dynamic action list service of FIG. 3 includes a member method createDynamicList ( ) (569). In many embodiments, createDynamicList is called by member methods within a user metric vector and parameterized with action IDs retrieved from metric action lists associated with the particular metrics that are outside their corresponding metric ranges. CreateDynamicList creates a dynamic action list including action IDs identified in dependence upon the metric IDs retrieved from the metric action lists and returns to its caller a reference to the dynamic action list.

The class diagram of FIG. 3 includes a device service class (218). The device service class provides a factory method named createDeviceList(actionID) that creates a list of devices and returns a reference to the list. In this example, createDeviceList( ) operates in a fashion similar to ActionService.createActionList( ) described above, by instanting a device list, searching through a device table for device IDs from device records having matching action ID entries, instantiating a device object of a concrete derived device class for each, adding to the device list a reference to each new device object, and returning to a calling action object a reference to the device list. In this example, however, the factory method createDeviceList( ) not only retrieves a device ID from its supporting data table, but also retrieves a network address or communications location for the physical device to be controlled by each device object instantiated, as illustrated by the following exemplary pseudocode:

```
//
// Device Service Class
//
class DeviceService
{
```

-continued

```
public static Device createDeviceList(actionID)
{
    DeviceList aDeviceList = new DeviceList( );
    int deviceID;
    // with finds of database device records storing data describing
    devices
    for(/* each device record matching actionID */) {
        // obtain device ID and device address from each matching
        device record
        deviceID = // device ID from matching database record
        deviceAddress = // device ID from matching database record
        // reminder: the device constructors below obtain from a device
        // service a list of devices administered by the device object
        switch(deviceID)
        {
            case 1: Device aDevice = new Device1(CommsService,
                    deviceAddress, deviceID);
                break;
            case 2: Device aDevice = new Device2(CommsService
                    deviceAddress, deviceID);
                break;
            case 3: Device aDevice = new Device3(CommsService
                    deviceAddress, deviceID);
                break;
            case 4: Device aDevice = new Device4(CommsService
                    deviceAddress, deviceID);
                break;
            case 5: Device aDevice = new Device5(CommsService
                    deviceAddress, deviceID);
                break;
        } // end switch( )
        aDeviceList.add(aDevice);
    } // end for( )
    return aDeviceList;
} // end createDeviceListObject( )
} // end class DeviceService
```

The createDeviceList( ) method in DeviceService class instantiates a device list for a metric with "DeviceList aDeviceList=new DeviceList( )." CreateDeviceList( ) then searches a device record table in a database for records having action IDs matching its call parameter. For each matching record in the table, createDeviceList( ) instantiates a device object through its switch statement, passing three parameters, CommsService, deviceAddress, and deviceId. CommsService is a reference to a communications service from which a device object can obtain a reference to a communications object for use in communicating with the physical device controlled by a device object. DeviceAddress is the network address, obtained from the device table as described above, of the physical device to be controlled by a particular device object. The switch statement selects a particular concrete derived device class for each device ID retrieved from the device table. CreateDeviceList( ) stores references to each device object in the device list with "aDeviceList.add( )." CreateDeviceList( ) returns a reference to the device list with "return aDeviceList."

The class diagram of FIG. 3 includes an exemplary device class (214). The exemplary device class (214) of FIG. 3 includes a deviceID field (472) uniquely identifying the physical device to be administered by the execution of the action. The exemplary device class (214) of FIG. 3 includes an address field (480) identifying a location of a physical device on a data communications network. The exemplary device class (214) of FIG. 3 provides a communications field (478) for a reference to an instance of a communications class that implements a data communications protocol to effect communications between an instance of a device class and a physical device.

The device class of FIG. 3 includes an attribute field (481) containing a value of current attribute of the device. An example of a current attribute of a device is an indication that the device is "on" or "off." Other examples of current attributes include values indicating a particular setting of a device. The device class of FIG. 3 also includes accessor methods (474, 476) for getting and setting attributes of a physical device. While the exemplary device class of FIG. 3 includes only one attribute field and accessor methods for getting and setting that attribute, many device classes useful in implementing methods of the present invention can support more than one attribute. Such classes can also include an attribute ID field and accessor methods for getting and setting each attribute the device class supports.

The exemplary class diagram of FIG. 3 includes a communications service class (219). The communications service class (219) provides a factory method named createCommsObject(deviceID, networkAddress) (574) that instantiates a communications object that implements a data communications protocol to effect communications between an instance of a device class and a physical device. The createCommsObject( ) method (574) finds a communications class ID in a communications class record in a communication class table having a device ID that matches its call parameter. In many embodiments, the createCommsObject( ) method (574) then instantiates a particular concrete derived communications class identified through a switch statement as described above, passing to the constructor the networkAddress from its parameter list, so that the new communications object knows the address on the network to which the new object is to conduct data communications. Each concrete derived communications class is designed to implement data communications according to a particular data communications protocol, Bluetooth, 802.11b, Lonworks, X-10, and so on.

The exemplary class diagram of FIG. 3 includes an exemplary communications base class (215). In typical embodiments, at least one concrete communications class is derived from the base class for each data communications protocol to be supported by a particular DML. Each concrete communications class implements a particular data communications protocol for communications device objects and physical devices. Each concrete communications class implements a particular data communications protocol by overriding interface methods (482, 484) to implement actual data communications according to a protocol.

Communications classes allow device classes (214) to operate independently with respect to specific protocols required for communications with various physical devices. For example, one light in a user's home may communicate using the LonWorks protocol, while another light in the user's home may communicate using the X-10 protocol. Both lights can be controlled by device objects of the same device class using communications objects of different communications classes, one implementing LonWorks, the other implementing X-10. Both device objects control the lights through calls to the same communications class interface methods, send( ) (482) and receive( ) (484), neither knowing nor caring that in fact their communications objects use different protocols.

The exemplary class diagram of FIG. 3 includes a domain state service (929). The domain state service includes a member method createDomainStateOjbect( ) (927). In many examples of methods of administering devices, createDomainStateObject( ) is parameterized with a user ID, metric vector ID, and metric space ID. createDomainStateObject( ) identifies at least one device in the domain, gets the current value of an attribute of that device. createDomainStateObject( ) returns to its caller a domain state object including a the user's current metric vector, the user's current metric space, and a current device state object including at least one device in the domain and the current value of an attribute of that device.

The exemplary class diagram of FIG. 3 includes a domain state object (914). The exemplary domain state object of FIG. 3 includes a userID (405) identifying the user. The exemplary domain state object of FIG. 3 includes a user's metric vector (606). In many examples, the metric vector is the user's current metric vector when the domain state object was created. The exemplary domain state object of FIG. 3 includes a metric space (610). In many examples, the metric space (610) of the domain state object is the user's current metric space when the domain state object was created. The domain state object of FIG. 3 also includes a current device state object "CDSO" (926). The current device state object (926) is a data structure including at least one device and the current value of an attribute of that device in the domain when the domain state object was created.

The class relationship diagram of FIG. 3 includes a current device state object (926). The current device state object (926) is a data structure including at least one device and the current value of an attribute of that device in the domain when the domain state object was created. The current device state object of FIG. 3 includes a device attribute table (927) including devices identified in the domain and current values of attributes of those devices. The current device state object of FIG. 3 also includes a member method add( ) (921) to add device IDs and current values of attributes to the current device state object.

Figure 4:
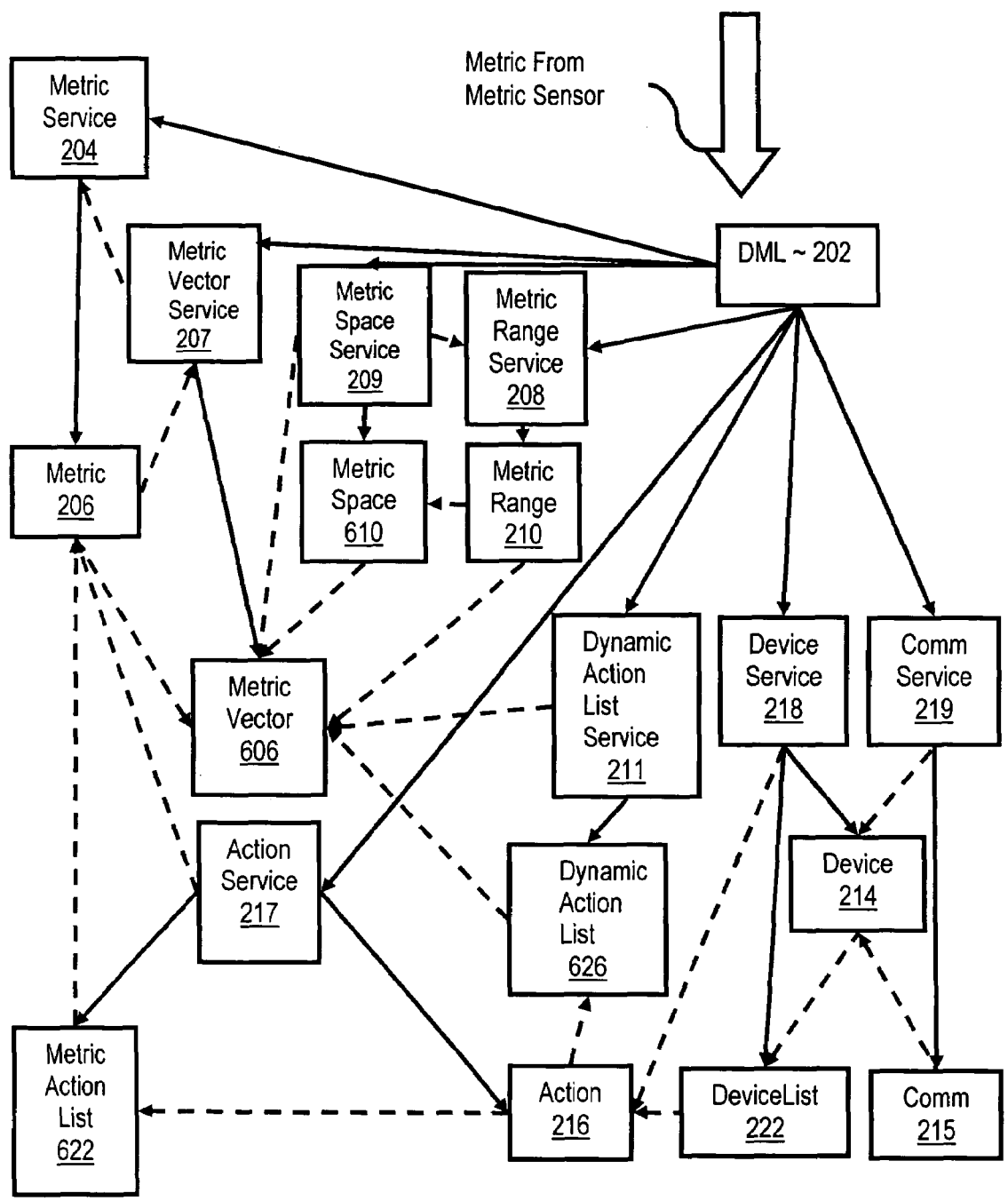
FIG. 4 is a class relationship diagram illustrating an exemplary relationship among the exemplary classes of FIG. 3.

FIG. 4 is a class relationship diagram illustrating an exemplary relationship among the exemplary classes of FIG. 3. In the class relationship diagram of FIG. 4, the solid arrows represent instantiation. The solid arrow points from the instantiating class to the instantiated class. In the class relationship diagram of FIG. 4, the dotted arrows represent references. The arrow points from a referenced class to a class whose objects possesses references to the referenced class. That is, an object-oriented relation of composition, a "has-a" relationship between classes, is shown by an arrow with a dotted line.

The exemplary class relationship diagram of FIG. 4 includes a DML class (202). A DML object of the DML class (202) instantiates an object of the metric service class (204), an object of the metric vector service class (207), and an object of the metric space service class (209). The DML object also instantiates an object of the metric range service class (208) an object of the action service class (217), and an object of the dynamic action list service class (211). The DML object also instantiates an object of the device service class (218) and an object of the communications service class (219).

When the DML receives a metric (200) from a metric sensor, the DML uses a call such as:

Metric aMetric=MetricService.createMetricObject
(userID, metricID, metricValue)

causing the metric service (204) to instantiate an object of the metric class (206). The metric service passes a reference to metric object (206) to metric vector service object (207). The metric object contains a reference to an object of the action service class (217) and a metric action list (622).

As shown in the class relationship diagram of FIG. 4, a metric vector service (207) instantiates an object of the metric vector class (606). In many embodiments, the metric vector service class receives a reference to a metric object and using a parameterized factory method, such as createMetricVectorObject( ), instantiates a metric vector object. As shown in the class relationship diagram of FIG. 4, an object of the metric vector class (606) contains a reference to an object of the metric class (206), an object of the metric space service class (209), an object of the metric space class (610), an object of the dynamic action list service class (211) and a dynamic action list (212).

As shown in the class relationship diagram of FIG. 4, a metric space service (209) instantiates an object of the metric space class (610). In many example embodiments, a metric space service uses a parameterized factory method, such as createMetricSpace( ), to instantiate a metric space object. The metric space service passes a reference to the metric space object (610) to the metric vector object. The metric space object (610) contains a reference to objects of the metric range class (210).

As shown in the class relationship diagram of FIG. 4, the metric range service (208) instantiates an object of the metric range class (210). In many examples embodiments of the present invention, the metric range service (208) uses a parameterized factory method, such as createRangeObject( ), to instantiate the metric range (210). The metric range service (208) passes to the metric space service (209) a reference to the metric range (210).

As shown in the class relationship diagram of FIG. 4, an action service (217) instantiates a metric action list (622) and objects of action classes (216). The metric action list (622) is instantiated with references to each of the instantiated actions (216). Each action (216) is instantiated with a reference to the device service (218). In typical examples of methods according to the present invention, the action service (217) uses a parameterized factory method, such as createActionList( ), to instantiate a metric action list (622) and instantiate actions (216). The action service (217) passes, to the metric (206), a reference to the metric action list (622).

As shown in FIG. 4, the dynamic action list service (211) instantiates a dynamic action list (626) and passes a reference to the dynamic action list (626) to calling methods in the metric vector (606). In typical examples of methods according to the present invention, the dynamic action list service (211) uses a method, such as createDynamicActionList( ) to instantiate a dynamic action list. In many embodiments, createDynamicActionList( ) is parameterized with action IDs of metric action lists associated with user metrics that are outside their corresponding metric ranges. The dynamic action list (626) possesses references to objects of the action class (216).

In the example of FIG. 4, the device service (218) instantiates a device list of the device list class (222) and instantiates a device object of the device class (214). The device list (222) is instantiated with a reference to the device object (214). The device object (214) is instantiated with a reference to the communications service (219). In typical examples of methods according to the present invention, the device service (218) uses a parameterized factory method, such as createDeviceList( ), to instantiate a device list (222) and instantiate a device object (216). The device service (218) passes, to the action (216), a reference to the device list (222)

In the example of FIG. 4, the communications service (219) instantiates a communications object of the communications class (215). In typical examples of the methods according to the present invention, the communications service (219) uses a parameterized factory method, such as createCommsObject( ), to instantiate a communications object (215). The communications service (219) passes, to the device object (214), a reference to the communications object (215).

Figure 5:
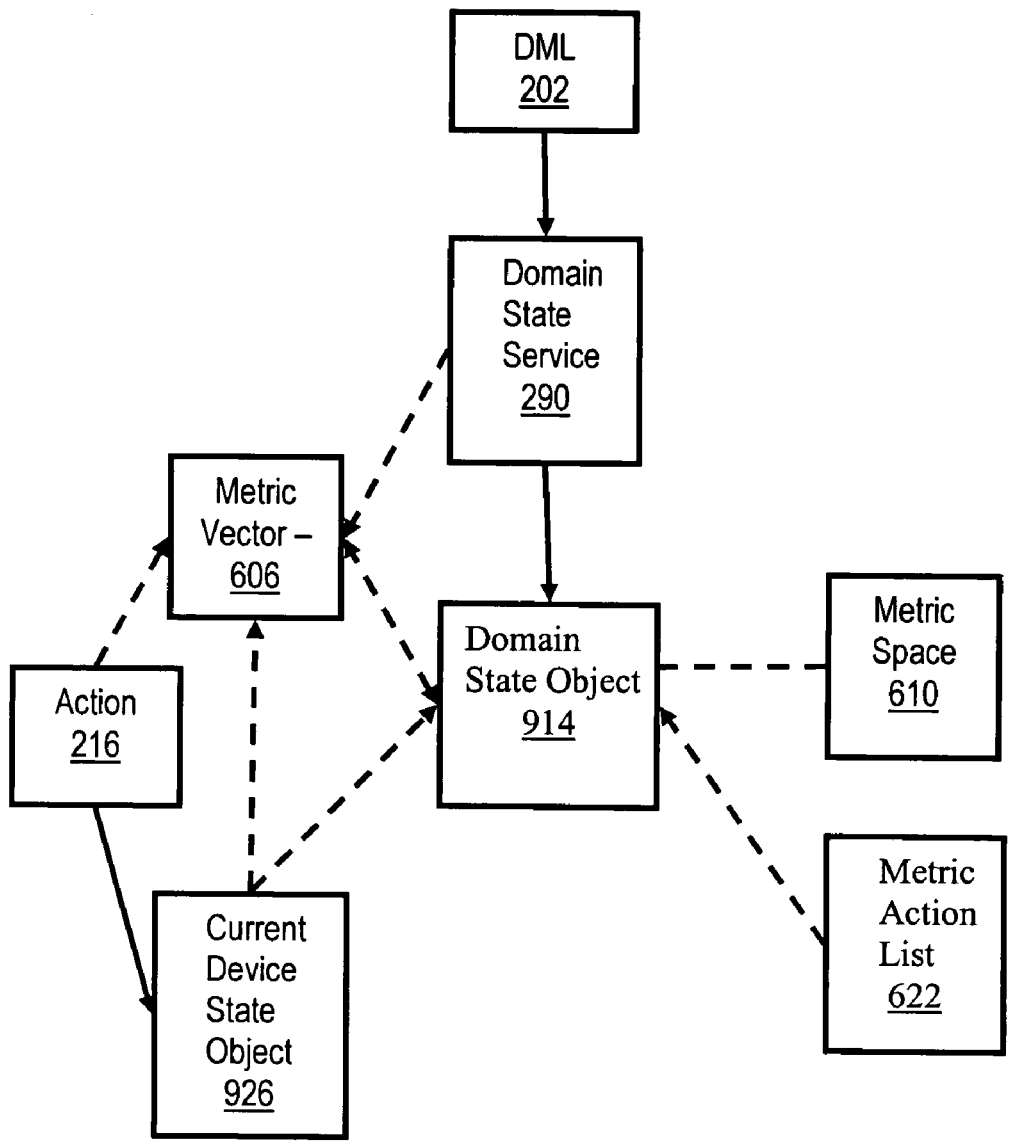
FIG. 5 is a class relationship diagram illustrating an exemplary relationship among the exemplary classes of FIG. 3.

FIG. 5 is a class relationship diagram illustrating an exemplary relationship among some of the classes of FIG. 3. In the example of FIG. 5, an object of the DML class (202) instantiates an object of the domain state service (290). An object of the domain state service (290) instantiates an object of the domain state object class (914) and an object of the current device state object class (926), using a method such as createDomainStateObject( ). The domain state object has a reference to metric vector object (606), a metric space object (610), and a current device state object (926).

Administering Devices in Dependence Upon User Metrics

Figure 6:
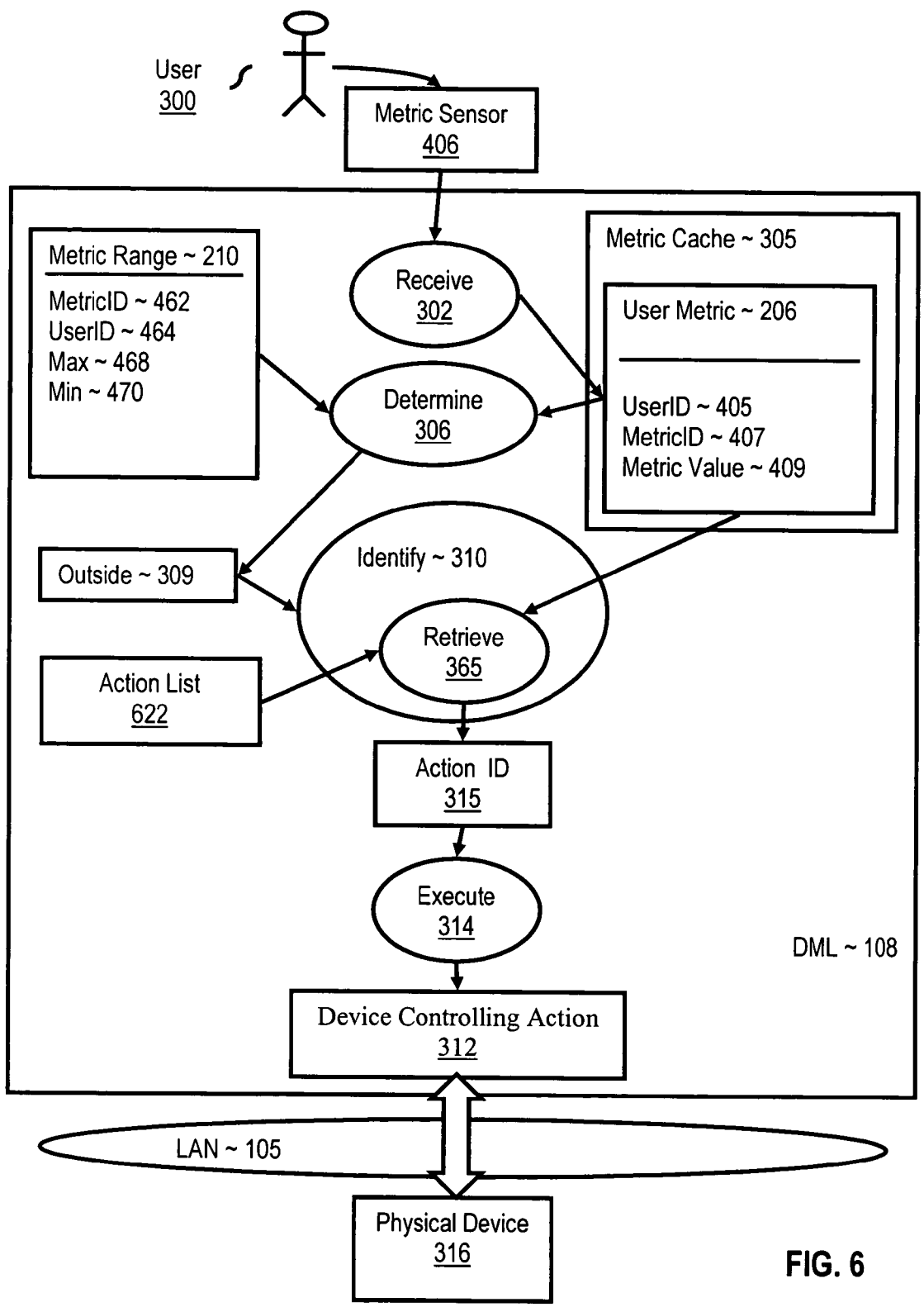
FIG. 6 is a data flow diagram illustrating an exemplary method of administering devices in accordance with the present invention.

FIG. 6 is a data flow diagram illustrating an exemplary method for administering devices. The method of FIG. 6 includes receiving (302) a user metric (206). As mentioned above, a "user metric" comprises data describing an indication of user condition. An "indication of a user's condition" is a quantifiable aspect of a user's condition and a quantity measuring the aspect. Examples of quantifiable aspects of a user's condition include body temperature, heart rate, blood pressure, location, galvanic skin response, or any other aspect of user condition as will occur to those of skill in the art.

In typical embodiments of the present invention, a user metric is implemented as a user metric data structure or record (206), such as the exemplary user metric (206) of FIG. 6. The user metric of FIG. 6 includes a userID field (405) identifying the user whose indication of condition is represented by the metric. The user metric (206) of FIG. 6 also includes a metric ID field (407) identifying the aspect of user condition the metric represents, such as, for example, blood pressure, heart rate, location, or galvanic skin response. The user metric (204) also includes a value field (409) containing the value of the aspect of the user's condition that the metric represents. An example of a value of a metric is a body temperature of 100° Fahrenheit.

In many embodiments of the method of FIG. 6, receiving (302) a user metric includes receiving a user metric from a metric sensor (406). In some examples of the method of FIG. 6, the metric sensor (406) reads an indication of a user's condition, creates a user metric in dependence upon the indication of a user's condition, and transmits the user metric to a DML. In many embodiments, the metric sensor transmits the user metric to the DML in a predefined data structure, such as the metric (206) of FIG. 6, to the DML using, for example, protocols such as Bluetooth, 802.11, HTTP, WAP, or any other protocol that will occur to those of skill in the art.

In the method of FIG. 6, receiving (302) a user metric includes receiving a user metric into metric cache memory (305). That is, a user metric is received by a DML and then stored in cache. In many embodiments of the method of FIG. 6, metric cache memory (305) is cache memory available to a DML to facilitate carrying out steps of administering devices in accordance with the present invention.

The method of FIG. 6 includes determining (306) whether a value of the user metric is outside (309) of a predefined metric range. A predefined metric range includes a predetermined range of values for a given metric ID for a particular user. In many embodiments of the method of FIG. 6, the predefined metric range is designed as a range of typical or normal metrics values for a user. One example of a predefined metric range is a range of metric values representing a resting heart rate of 65-85 beats per minute.

In many examples of the method of FIG. 6, a predefined metric range for a user is implemented as a data structure or record such as the metric range (210) of FIG. 6. The metric range of FIG. 6 includes a metric ID field (462) identifying the kind of user metrics. The metric range of FIG. 6 includes a user ID field (464) identifying the user for whom the metric range represents a range of metric values. The metric range of FIG. 6, for example, includes a Max field (468) representing the maximum metric value of the metric range and a Min field (470) representing the minimum metric value of the metric range. That is, in typical embodiments, it is a maximum and minimum metric value in a range that defines a value range for the metric.

In many embodiments, determining (306) that the value of the user metric (206) is outside (309) of a predefined metric range includes comparing the metric value of a user metric with the maximum and minimum values from a metric range for that metric and for the same user. In many examples of the method of FIG. 6, determining that a user metric is outside a predefined metric range also includes determining that the metric value (409) of the user metric (206) is either greater than the maximum value (468) of the metric range (210) or below the minimum value (470) of the range in the metric range (210). A user metric of metric ID identifying the metric as 'heart rate' having, for example, a metric value of 100 beats per minute is outside the exemplary metric range for resting heart rate of 65-85 beats per minute.

If the value of the user metric is outside the metric range, the method of FIG. 6 includes identifying (310) an action in dependence upon the user metric. An action includes one or more computer programs, subroutines, or member methods that when executed, control one or more devices. Actions are typically implemented as object oriented classes and manipulated as objects or references to objects. In fact, in this specification, unless context indicates otherwise, the terms 'action,' 'action object,' and 'reference to an action object' are treated more or less as synonyms. In many embodiments of the method of FIG. 6, an action object calls member methods in a device class to affect current attributes of the physical device. In many embodiments of the method of FIG. 6, action classes or action objects are deployed in OSGi bundles to a DML on a services gateway.

In the method of FIG. 6, identifying (310) an action includes retrieving (365) an action ID (315) from a metric action list (622) organized by user ID and metric ID. In the method of FIG. 6, retrieving an action ID from a metric action list includes retrieving from a list the identification of the action (the 'action ID') to be executed when a value of a metric of a particular metric ID and for a particular user is outside the user's predetermined metric range. The action list can be implemented, for example, as a Java list container, as a table in random access memory, as a SQL database table with storage on a hard drive or CD ROM, and in other ways as will occur to those of skill in the art.

As mentioned above, the actions themselves comprise software, and so can be implemented as concrete action classes embodied, for example, in a Java package imported into the DML at compile time and therefore always available during DML run time. Executing (314) an action (312) therefore is often carried out in such embodiments by use of a switch( ) statement in the DML. Such a switch( ) statement can be operated in dependence upon the action ID and implemented, for example, as illustrated by the following segment of pseudocode:

```
switch (actionID) {
    Case 1: actionNumber1.take_action( ); break;
```

```
        Case 2: actionNumber2.take_action( ); break;
        Case 3: actionNumber3.take_action( ); break;
        Case 4: actionNumber4.take_action( ); break;
        Case 5: actionNumber5.take_action( ); break;
        // and so on
} // end switch( )
```

The exemplary switch statement selects a particular device controlling object for execution depending on the action ID. The device controlling objects administered by the switch( ) in this example are concrete action classes named action-Number1, actionNumber2, and so on, each having an executable member method named 'take_action( ),' which carries out the actual work implemented by each action class.

Executing (314) an action (312) also is often carried out in such embodiments by use of a hash table in the DML. Such a hash table can store references to action object keyed by action ID, as shown in the following pseudocode example. This example begins by an action service's creating a hashtable of actions, references to objects of concrete action classes associated with a particular metric ID, using action IDs as keys. In many embodiments it is an action service that creates such a hashtable, fills it with references to action objects pertinent to a particular metric ID, and returns a reference to the hashtable to a calling metric object.

```
Hashtable ActionHashTable = new Hashtable( );
ActionHashTable.put("1", new Action1( ));
ActionHashTable.put("2", new Action2( ));
ActionHashTable.put("3", new Action3( ));
```

Executing a particular action then can be carried out according to the following pseudocode:

```
Action anAction = (Action) ActionHashTable.get("2");
if (anAction != null) anAction.take_action( );
```

Many examples in this specification are described as implemented with lists, often with lists of actions, for example, returned with a reference to a list from an action service, for example. Lists often function in fashion similar to hashtables. Executing a particular action, for example, can be carried out according to the following pseudocode:

```
List ActionList = new List( );
ActionList.add(1, new Action1( ));
ActionList.add(2, new Action2( ));
ActionList.add(3, new Action3( ));
```

Executing a particular action then can be carried out according to the following pseudocode:

```
Action anAction = (Action) ActionList.get(2);
if (anAction != null) anAction.take_action( );
```

The three examples just above use switch statements, hash tables, and list objects to explain executing actions according to embodiments of the present invention. The use of switch statements, hash tables, and list objects in these examples are for explanation, not for limitation. In fact, there are many ways of executing actions according to embodiments of the present invention, as will occur to those of skill in the art, and all such ways are well within the scope of the present invention.

Figure 7:
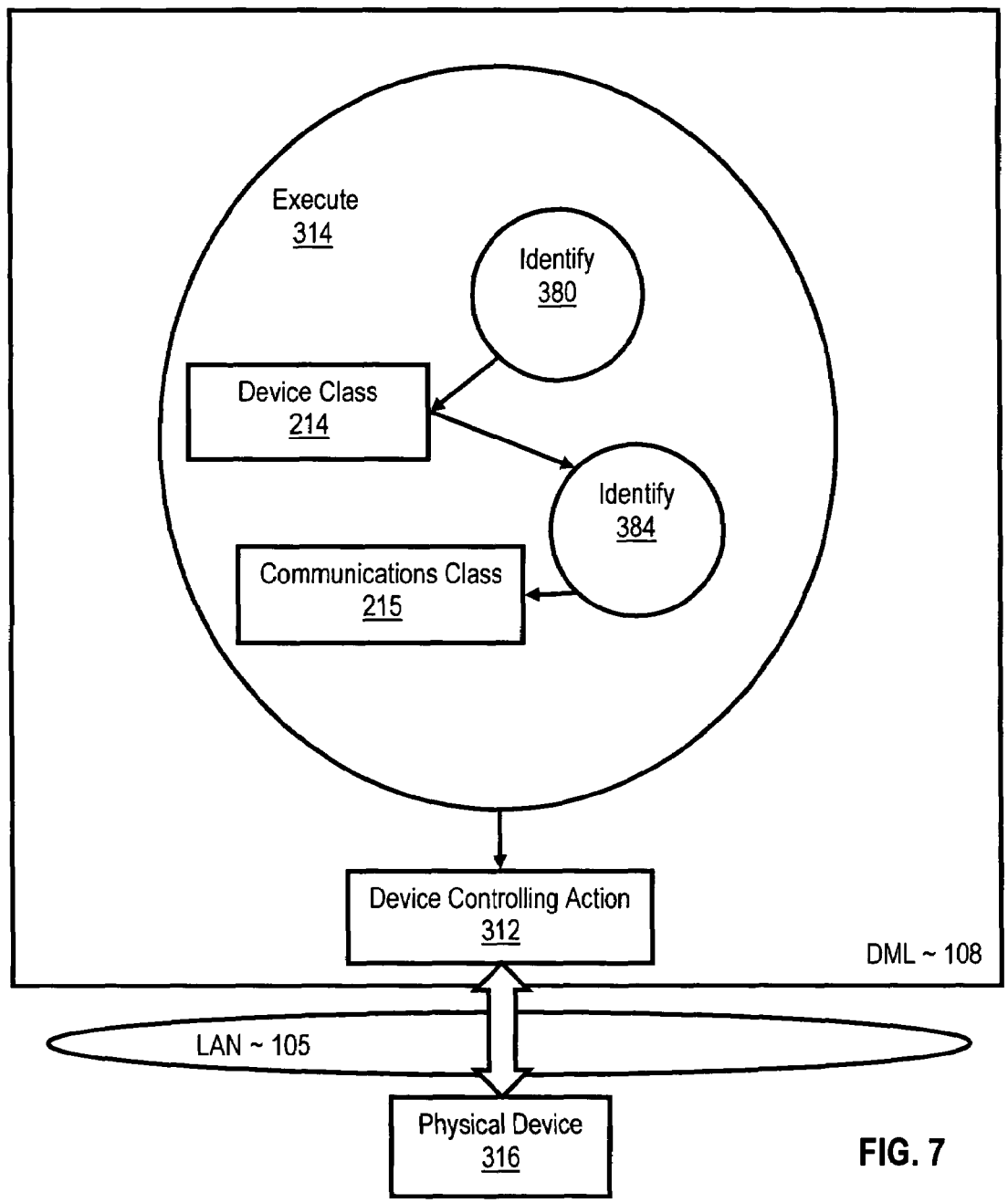
FIG. 7 is a data flow diagram illustrating an exemplary method of executing an action.

FIG. 7 sets forth a data flow diagram illustrating an exemplary method of executing an action. In the method of FIG. 7, executing an action includes identifying (380) a device class (214) representing a physical device (316) administered by the action. Typical device classes include member methods for administering the device. Typical member methods for administering the device include member methods for getting and setting values of device attributes in physical devices. In the case of a lamp supporting multiple settings for light intensity, for example, a member method get( ) in a device class can gets from the lamp a value for light intensity, and a member method set( ) in a device class sets the light intensity for the lamp.

In the method of FIG. 7, executing an action includes identifying (384) a communication class (215) for the physical device (316). To communicate the member methods of the device class to the physical device, a communications class implements a protocol for communicating with a physical device. Typical communications classes include member methods that construct, transmit, and receive data communications messages in accordance with the protocol implemented by a communication class. The member methods in a communication class transmit and receive data communications messages to and from a physical device. A communications class advantageously separates the protocols used to communicate with the physical device from the actions to be effected on the device, so that a device class interface comprising get( ) and set( ) methods, for example, can usefully communicate with a physical device by use of any data communications protocol with no need to reprogram the device class and no need to provide one device class for each combination of physical device and protocol.

For further explanation, consider the following brief use case. A user's metric sensor reads the user's heart rate at 100 beats per minute, and creates a metric for the user having a user ID identifying the user, a metric ID identifying the metric as "heart rate," and a metric value of 100. The metric sensor transmits the user metric to the DML through a services gateway. The DML receives the user metric and compares the user metric with the user' metric range for resting heart rates having a range of 65-85. The DML determines that the user metric is outside the predefined metric range. The DML uses the user ID and the metric ID to retrieve from a list an action ID for a predefined action to be executed in response to the determination that the value of the user's heart rate metric value is outside the user's metric range for heart rate. The DML finds a device controlling-action ID identifying an action object having a class name of 'someAction,' for example, and also having an interface member method known to the DML, such as the take_action ( ) method described above in the switch( ) statement.

In this example, the DML effects the action so identified by calling someAction.take_action( ). The take_action( ) method in this example is programmed to call a device service for a list of references to device objects representing physical devices whose attributes are to be affected by the action. The device service is programmed with a switch( ) statement to create in dependence upon the action ID a list of references to device objects and return the device list to the calling action object, or rather, to the calling take_action( ) method in the action object.

In creating the device list, the device service is programmed to instantiate each device having a reference entered in the list, passing as a constructor parameter a reference to a communications service. Each device so instantiated has a constructor programmed to call a parameterized factory method in the communications service, passing as a parameter an identification of the calling device object. The communications service then instantiates and returns to the device a reference to a communication object for the communications protocol needed for that device object to communicate with its corresponding physical device.

The principal control logic for carrying out an action typically, in embodiments of the present invention, resides in the principal interface method of an action class and objects instantiated from it. In this example, the take_action( ) method is programmed to carry out a sequence of controlling method calls to carry out the changes on the physical devices that this action class was developed to do in the first place. The take_action( ) method carries out this work with a series of calls to accessor methods (set( ) and get( ) methods) in the device objects in its device list.

Figure 8:
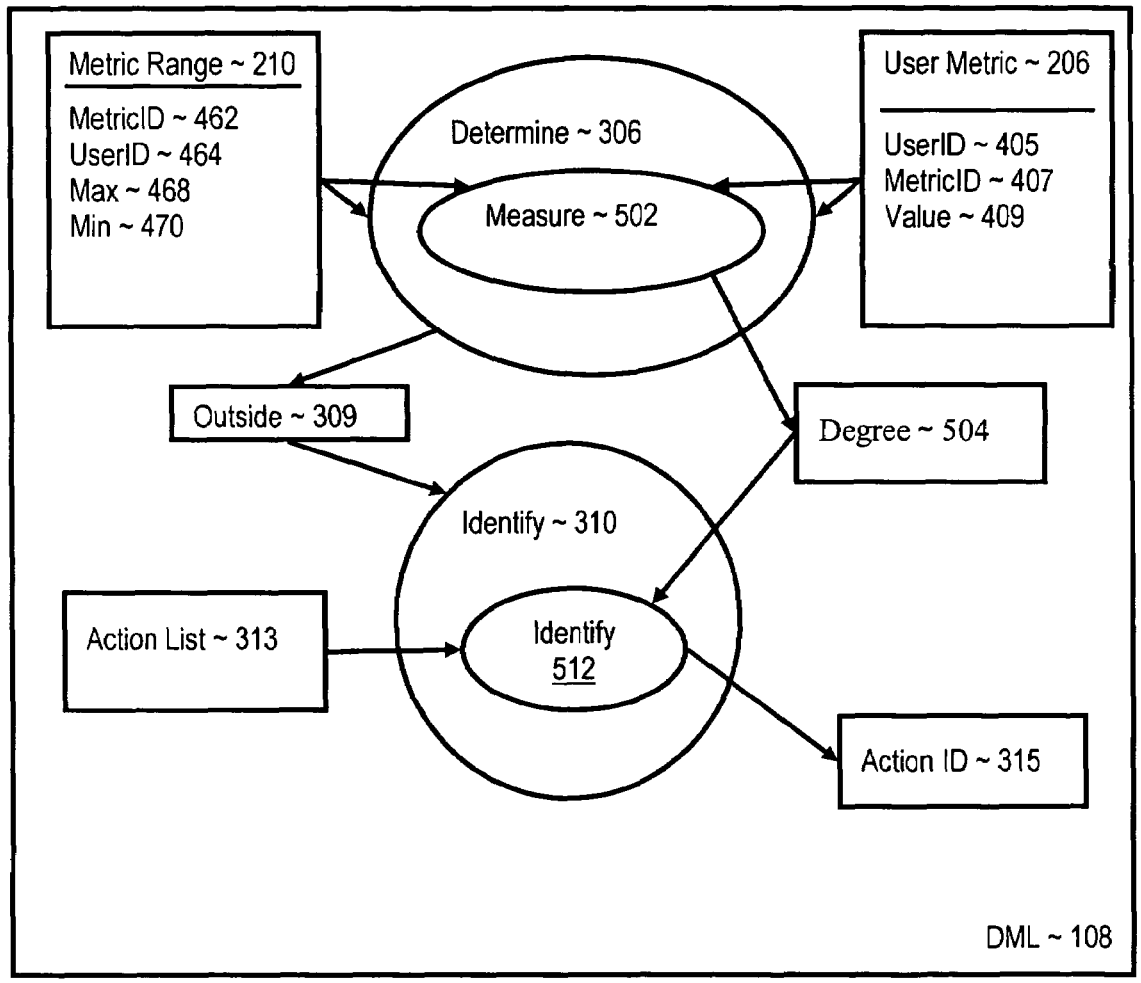
FIG. 8 is a data flow diagram illustrating an exemplary method of determining whether a user metric is outside a predefined metric range for the user in accordance with the present invention.

FIG. 8 is a data flow diagram illustrating an exemplary method of determining (306) that the user metric (206) is outside the predefined metric range (210). In many embodiments of methods for administering devices, the user metric (206) is represented in data as a data structure or record, such as the user metric record of FIG. 8. The user metric (206) includes a user ID field (405), a metric ID field (407), and a value field (409).

In the example of FIG. 8, a predefined metric range for a metric is represented in data as a metric range such as the metric range (210) of FIG. 8. The exemplary metric range (210) sets forth a maximum range value (468) and a minimum range value (470) for a particular user for a particular metric. The particular user and the particular metric for the exemplary range are identified respectively in a user ID field (464) and a metric ID field (462).

In the method of FIG. 8, determining (306) that value of the user metric (206) is outside (309) of a predefined metric range (210) includes measuring (502) a degree (504) to which the user metric (206) is outside (309) the predefined metric range (210). In many embodiments of the present invention, measuring (502) the degree (504) to which the user metric (206) is outside (309) the metric range (210) includes identifying the magnitude by which the value of the user metric is greater than the maximum metric value the metric range or the magnitude by which the value of the user metric value is less than the minimum value of the predefined metric range. To the extent that measuring the degree to which a metric is out of range includes identifying a measure as greater than a maximum range value or less than a minimum range value, the measurement often advantageously includes both a magnitude and an indication of direction, such as, for example, a sign (+or −), an enumerated indication such as, for example, 'UP' or 'DOWN', or a Boolean indication such as true for high and false for low.

In the method of FIG. 8, identifying (310) an action in dependence upon the user metric includes identifying (512) an action in dependence upon the degree (504) to which the value of the user metric (206) is outside (309) the metric range and also often in dependence upon the direction in which the metric is out of range. In many embodiments of the method of FIG. 8, identifying (512) the action in dependence upon the degree (504) to which the user metric is outside the predefined metric range includes retrieving an action ID from a metric action list (622) organized by metric ID, user ID, degree, and direction.

In many DMLs according to the present invention are preinstalled device classes for all of the devices the DML supports. Newly acquired physical devices identify themselves as being on the network and the DML associates the device ID with the device class already installed on the DML. In such an example embodiment, the DML identifies the device by associating the device ID with the pre-installed device class.

Figure 9:
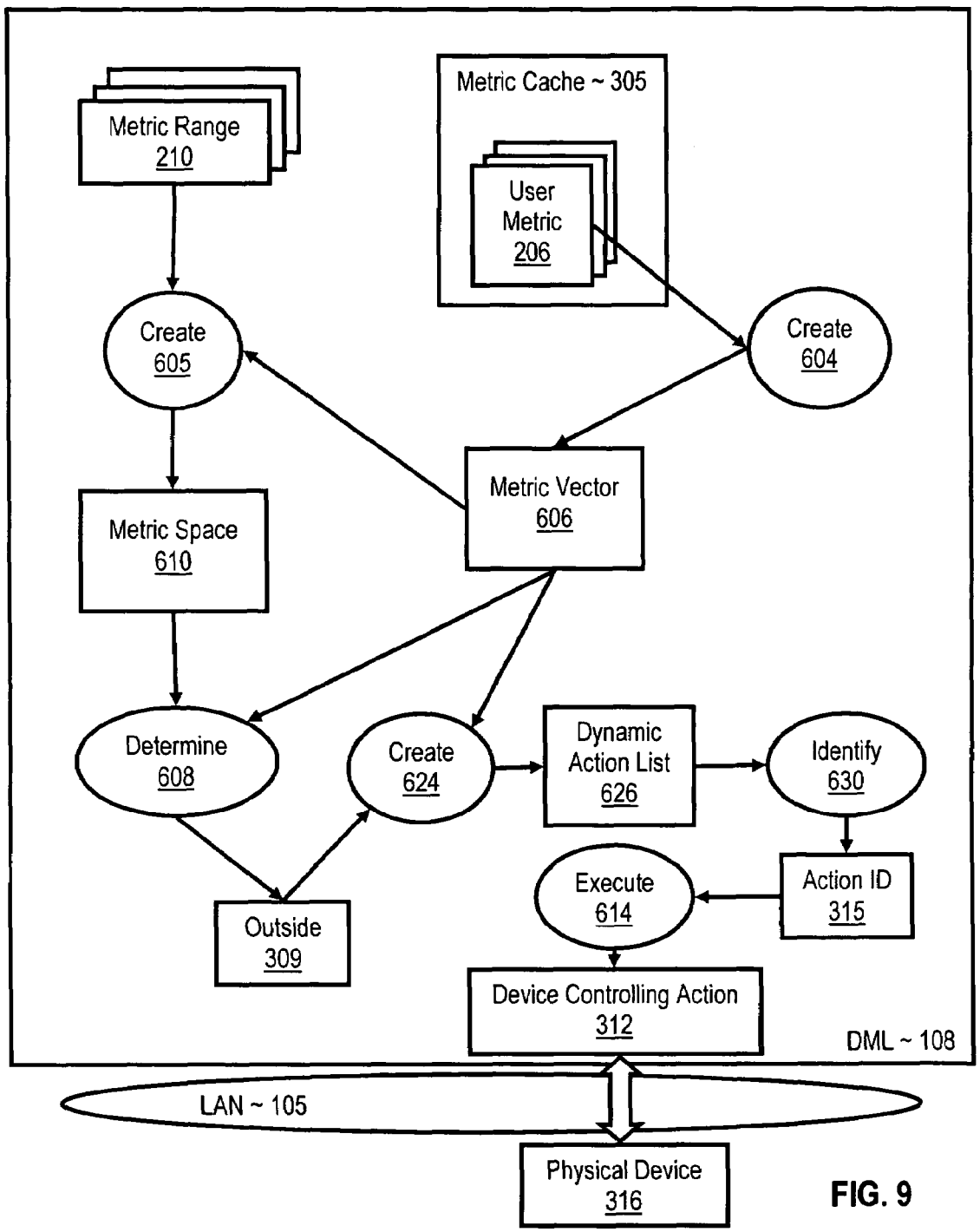
FIG. 9 is a data flow diagram illustrating an exemplary method of administering devices in accordance with the present invention.

Administering Devices in Dependence Upon User
Metric Vectors Including Dynamic Action Lists FIG. 9 is a data flow diagram illustrating a method for administering devices in accordance with the present invention. The method of FIG. 9 includes creating (604) a user metric vector (606) comprising a plurality of disparate user metrics (206). A user metric vector comprised of a plurality of disparate user metrics represents a complex indication of user condition having multiple quantifiable aspects of a user's condition and multiple quantities measuring the aspects. That is, a user metric vector is a collection of a user metrics each representing a single quantifiable aspect of a user's condition and a quantity measuring the aspect.

The term 'disparate' user metrics means user metrics of different kinds. A user metric vector (606) being comprised of a plurality of disparate user metrics is therefore a complex indication of a user's condition comprising a plurality of different kinds of aspects of user condition and plurality of quantities measuring those aspect. In many examples of the method of FIG. 9, the user metric vector (606) comprises references the current user metric objects instantiated by a metric service.

In typical embodiments of the present invention, a user metric vector is implemented as a user metric vector data structure or record, such as the exemplary user metric vector (606) discussed above with reference to FIG. 3. The user metric vector (606) includes a user ID (405 on FIG. 3) identifying the user and a metric vector ID (408 on FIG. 3) uniquely identifying the user metric vector. The user metric vector (606) also includes data storage for a metric list (652 on FIG. 3) containing references to disparate user metrics.

The method of FIG. 9 includes creating (605) a user metric space (610) comprising a plurality of metric ranges (210). A user metric space (610) is comprised of a plurality of disparate metric ranges for a user. That is, a metric space is defined by a plurality of disparate metric ranges for a plurality of disparate metric IDs. In many exemplary embodiments of the present invention, a metric space is implemented as a metric space data structure such as the exemplary metric space (610) of FIG. 3 including a user ID and data storage (655) for a list of references to disparate metric ranges for a user.

The method of FIG. 9 includes determining (608) whether the user metric vector (606) is outside (309) the user metric space (610). In various alternative example embodiments determining (608) whether the user metric vector (606) is outside (309) a user metric space (610) is carried out using different methods. Methods of determining whether the user metric vector (606) is outside (309) a user metric space (610) range in complexity from relatively straightforward comparison of the user metrics of the metric vector with their corresponding metric ranges of the metric space to more complex algorithms. Exemplary methods of determining (608) whether the user metric vector (606) is outside (309) a user metric space (610) are described in more detail below with reference to FIG. 11.

If the user metric vector (606) is outside (309) a user metric space (610), the method of FIG. 9 includes creating (624), in dependence upon the user metric vector (606), a dynamic action list (626). In many examples of the method of FIG. 9, a dynamic action list is a list of action IDs created in dependence upon metric action lists that are associated with the particular metrics of the user metric vector that are outside their corresponding metric ranges of the user metric space. That is, each metric of the metric vector that is outside its corresponding metric range has an associated metric action list. The associated metric action list includes action IDs for execution when its associated metric is outside its corresponding metric range. A dynamic action list is an action list including action IDs identified in dependence upon those metric action lists associated with the particular metrics of a user metric vector outside their corresponding metric ranges of the user metric space. A dynamic action list advantageously provides a list of action IDs tailored to the user's current condition.

In many example embodiments of the present invention, creating a dynamic action list includes calling member methods in a dynamic action service object. In many examples of the method of FIG. 9, creating a dynamic action list includes parameterizing a member method, such as createDynamicActionList( ), with action IDs retrieved from action lists associated with the particular user metrics of the user metric vector that are outside their corresponding metric ranges of the user metric space. In many examples of the method of FIG. 9, createDynamicActionList( ) returns to its caller in the user metric vector a dynamic action list including action IDs identified in dependence upon the action IDs contained in metric action lists. In various alternative examples of the method of FIG. 9, a dynamic action list can is implemented, for example, as a hashtable, Java list container, as a table in random access memory, as a SQL database table with storage on a hard drive or CD ROM, and in other ways as will occur to those of skill in the art.

The method of FIG. 9 includes identifying (630) at least one action (315) in the dynamic action list (626). In typical embodiments of the method of FIG. 9, identifying an action includes retrieving from a dynamic action list the identification of the action (the 'action ID') to be executed.

An action typically includes one or more computer programs, subroutines, or member methods that when executed, control one or more devices. Actions are typically implemented as object oriented classes and manipulated as objects or references to objects. In fact, in this specification, unless context indicates otherwise, the terms 'action,' 'action object,' and 'reference to an action object' are treated more or less as synonyms. In many examples of the method of FIG. 9, an action object calls member methods in a device class to affect current attributes of the physical device. In many examples of the method of FIG. 9, action classes or action objects are deployed in OSGi bundles to a DML on a services gateway.

The method of FIG. 9 includes executing the action (614). Executing an action therefore is often carried out in such embodiments by use of a switch( ) statement in the DML. Such a switch( ) statement can be operated in dependence upon the action ID and implemented, for example, as illustrated by the following segment of pseudocode:

```
switch (actionID) {
    Case 1: actionNumber1.take_action( ); break;
    Case 2: actionNumber2.take_action( ); break;
    Case 3: actionNumber3.take_action( ); break;
    Case 4: actionNumber4.take_action( ); break;
```

-continued

```
    Case 5: actionNumber5.take_action( ); break;
    // and so on
} // end switch( )
```

The exemplary switch statement selects a particular device controlling object for execution depending on the action ID. The device controlling objects administered by the switch( ) in this example are concrete action classes named actionNumber1, actionNumber2, and so on, each having an executable member method named 'take_action( ),' which carries out the actual work implemented by each action class.

In many examples of the method of FIG. 9, executing an action is carried out use of a hash table in a DML. Such a hash table stores references to action object keyed by action ID, as shown in the following pseudocode example. This example begins by a dynamic action list service's creating a hashtable of actions, references to objects of concrete action classes associated with a particular metric ID, using action IDs as keys. In many embodiments it is a dynamic action list service that creates such a hashtable, fills it with references to action objects pertinent to a particular metric ID of the user metric vector outside its corresponding metric range of the user metric space, and returns a reference to the hashtable to a calling vector object.

```
Hashtable DynamicActionHashTable = new Hashtable( );
DynamicActionHashTable.put("1", new Action1( ));
DynamicActionHashTable.put("2", new Action2( ));
DynamicActionHashTable.put("3", new Action3( ));
```

Executing a particular action then can be carried out according to the following pseudocode:

```
Action anAction = DynamicActionHashTable.get("2");
if(anAction != null) anAction.take_action( );
```

Many examples of the method of FIG. 9 are also implemented through the use of lists. Lists often function in fashion similar to hashtables. Building such a list can be carried out according to the following pseudocode:

```
List DynamicActionList = new List( );
DynamicActionList.add(1, new Action1( ));
DynamicActionList.add(2, new Action2( ));
DynamicActionList.add(3, new Action3( ));
```

Executing a particular action then can be carried out according to the following pseudocode:

```
Action anAction = DynamicActionList.get(2);
if (anAction != null) anAction.take_action( );
```

The three examples just above use switch statements, hash tables, and list objects to explain executing actions according to embodiments of the present invention. The use of switch statements, hash tables, and list objects in these examples are for explanation, not for limitation. In fact, there are many ways of executing actions according to embodiments of the present invention, as will occur to those of skill in the art, and all such ways are well within the scope of the present invention.

In some examples of the method of FIG. 9, executing an action includes identifying a device class for the device. Typical device classes include member methods for administering the device. Typical member methods for administering the device include member methods for getting and setting values of device attributes in physical devices. In the case of a lamp supporting multiple settings for light intensity, for example, a member method get( ) in a device class can gets from the lamp a value for light intensity, and a member method set( ) in a device class sets the light intensity for the lamp.

In many examples of the method of FIG. 9, executing an action includes identifying a communications class for the device. To communicate the member methods of the device class to the physical device, a communications class implements a protocol for communicating with a physical device. Typical communications classes include member methods that construct, transmit, and receive data communications messages in accordance with the protocol implemented by a communication class. The member methods in a communication class transmit and receive data communications messages to and from a physical device. A communications class advantageously separates the protocols used to communicate with the physical device from the actions effecting the device, so that a device class interface comprising get( ) and set( ) methods, for example, can usefully communicate with a physical device by use of any data communications protocol with no need to reprogram the device class and no need to provide one device class for each combination of physical device and protocol.

Figure 10:
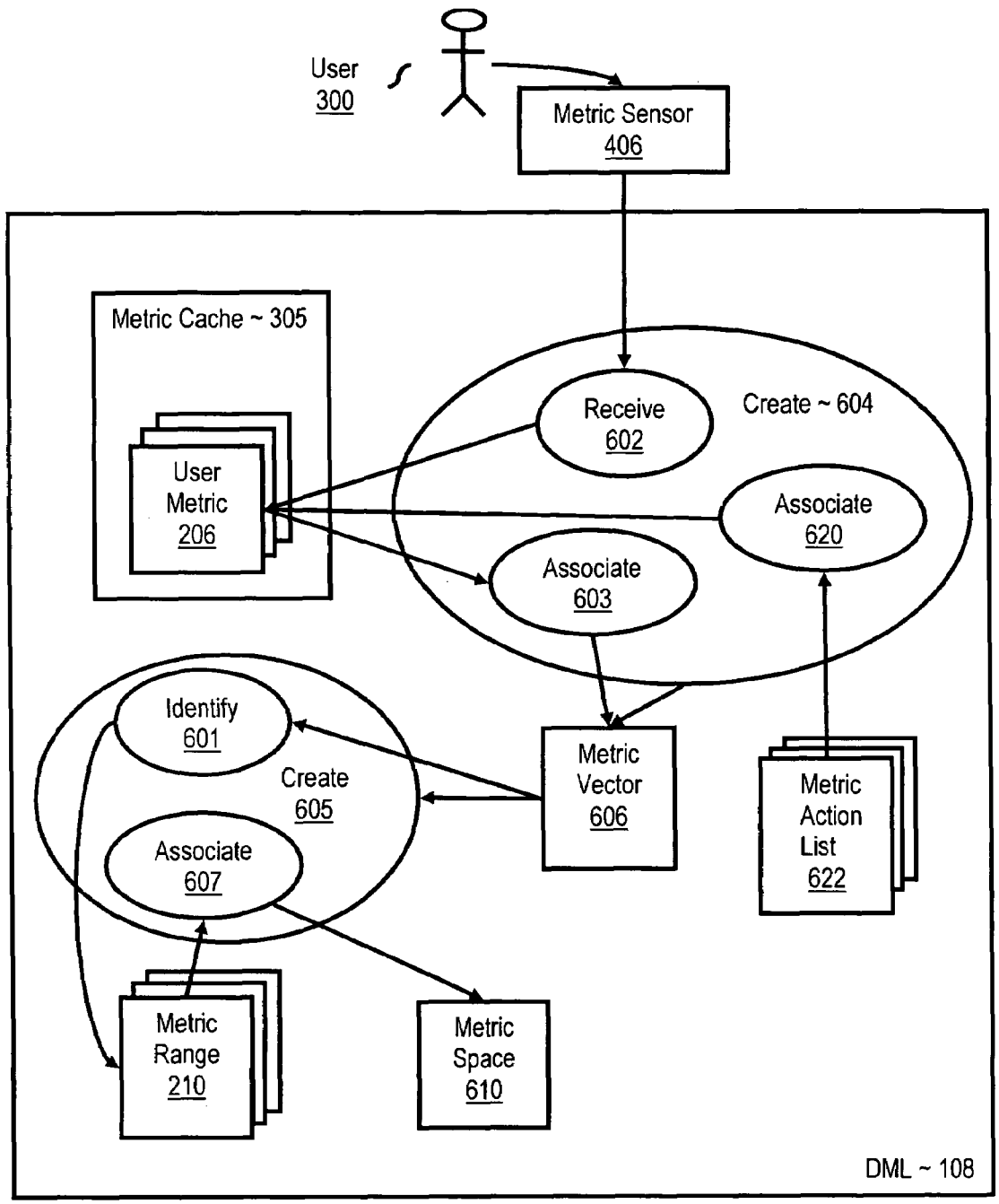
FIG. 10 is a data flow diagram illustrating an exemplary method of creating a user metric vector and an exemplary method of creating a metric space.

FIG. 10 is a data flow diagram illustrating an exemplary method of creating (604) a user metric vector (606) and an exemplary method of creating (605) a user metric space (610). In the method of FIG. 10, creating (604) a user metric vector (606) includes receiving (602) a plurality of disparate user metrics (206) having a plurality of metric values and a plurality of disparate metric IDs. In many embodiments of the method of FIG. 10, receiving (602) a plurality of disparate user metrics (206) includes receiving disparate user metrics from one or more metric sensors (406). In some examples of the method of FIG. 10, the metric sensor (406) reads an indication of a user's condition, creates a user metric in dependence upon the indication of a user's condition, and transmits the user metric to a DML In many embodiments, the metric sensor transmits the user metric to the DML in a predefined data structure, such as the metric (206) of FIG. 3, to the DML using, for example, protocols such as Bluetooth, 802.11, HTTP, WAP, or any other protocol that will occur to those of skill in the art.

In the method of FIG. 10, creating (604) a user metric vector (606) includes associating (603) the plurality of disparate user metrics (206) with the user metric vector (606). 'Associated,' generally in this disclosure and subject to context, means associated by reference. That is, saying that an object of one class is associated with another object means that the second object possesses a reference to the first. The objects can be mutually associated, each possessing a reference to the other. Other relations among objects, aggregation, composition, and so on, are usually types of association, and the use of any of them, as well as others as will occur to those of skill in the art, is well within the scope of the present invention. In the exemplary method of FIG. 10, associating (603) the plurality of disparate user metrics (206) with the user metric vector (606) is carried out by providing references to a plurality of disparate metric objects in the user metric vector (606).

In the method of FIG. 10, creating (604) a user metric vector (606) comprising a plurality of disparate user metrics (206) includes associating (620) at least one metric action list (622) with each disparate user metric (206). In many examples of the method of FIG. 10, a plurality of metric action lists are associated with each metric of the user vector. The action IDs included in a metric action list associated with a particular metric identify actions designed to administer devices in accordance with the particular aspect of user condition represented by that metric. That is, a metric action list is tailored to affecting the user condition represented by the metric. For example, a metric list associated with a body temperature metric may include actions that administer devices such as an air conditioner, a fan, a heater, automated window shades an the like.

In many examples of the method of FIG. 10, creating a user metric vector includes associating a plurality of metric action lists with a single user metric. Some such examples of the method of FIG. 10 include associating one metric action list with the user metric including action IDs for execution when the value of the user metric is above its corresponding metric range and another metric action list including action IDs for execution when the value of the user metric is below its corresponding metric range. Some examples of the method of FIG. 10 also include associating metric action lists with a user metric that include action IDs for execution in dependence upon the degree and direction that the user metric is outside its corresponding metric range.

The method of FIG. 10 includes creating (605) a user metric space (610) comprising a plurality of metric ranges. In many examples of the method of FIG. 10, a user metric space (610) is comprised of a plurality of disparate metric ranges that correspond in kind to the user metrics containing in the user metric vector. In the method of FIG. 10, creating (602) a user metric space (610) includes identifying (601) a plurality of metric ranges (210) for a plurality of disparate metrics (206) and associating (607) the plurality of disparate metric ranges (210) for the plurality of disparate metrics (206) with the user metric space (610).

In many examples of the method of FIG. 10, identifying (601) a plurality of metric ranges (210) and associating (607) the plurality of metric ranges (210) the user metric space (610) is carried out by a metric space service that is instantiated by a DML. The metric space service receives, from a user metric vector, a user metric vector ID and searches a metric space list identified by metric vector ID for a metric space and returns to the user metric vector a metric space ID identifying a metric space for comparison with the user metric vector. If there is no metric space for the metric vector ID, the metric space service instantiates one and stores the metric space ID in the metric space table.

Figure 11:
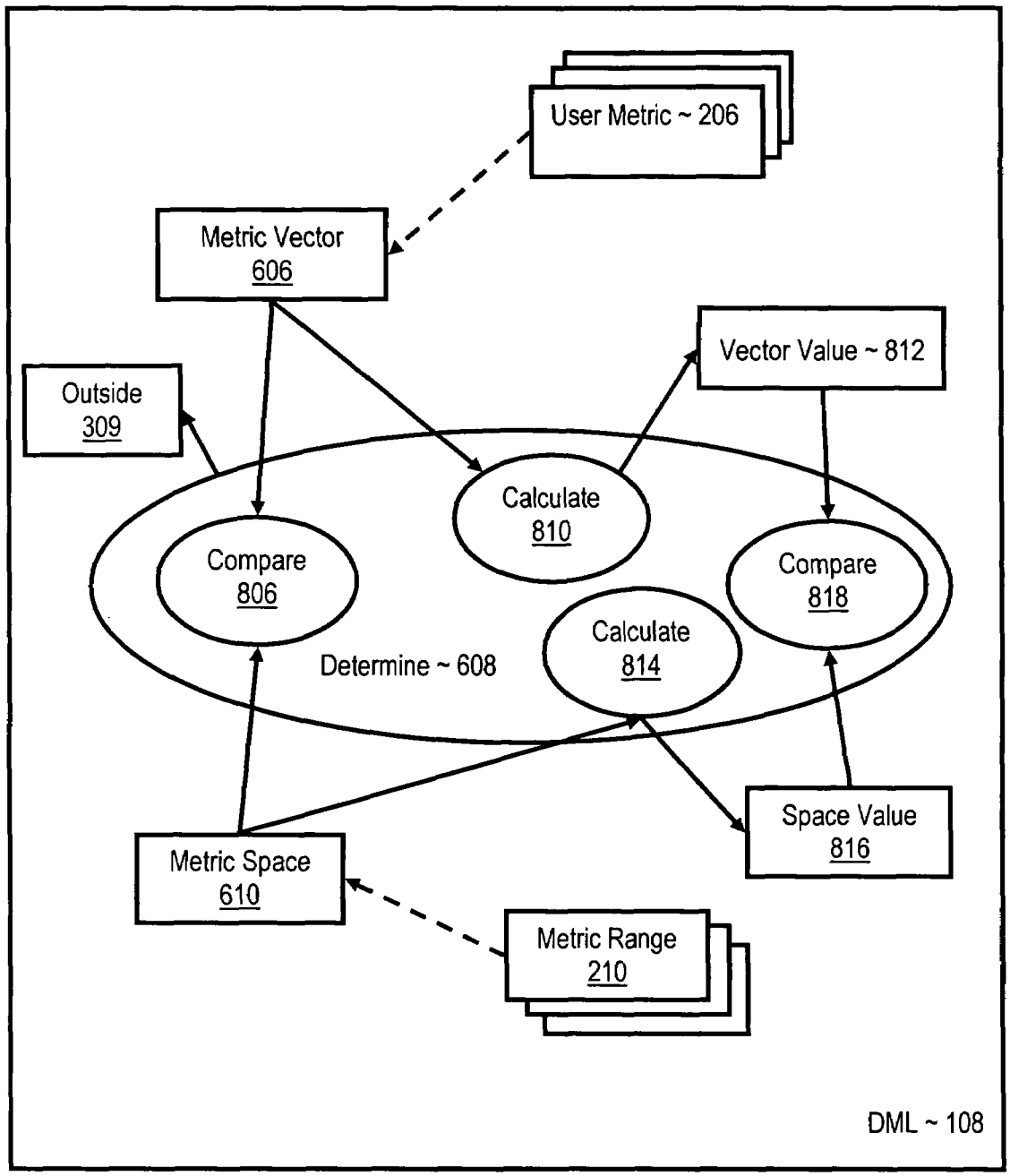
FIG. 11 is a data flow diagram illustrating an exemplary method of determining whether a user metric vector is outside a user metric space.

FIG. 11 is a data flow diagram illustrating two exemplary methods of determining (608) whether the user metric vector (606) is outside (309) a user metric space (610). The first illustrated method of determining (608) whether the user metric vector (606) is outside (309) a user metric space (610) includes comparing (806) the metric values of the metric of the user metric vector (606) with the metric ranges (210) of the metric space (610). In some examples of the present invention, comparing a metric value of a user metric vector with its corresponding metric range includes measuring a degree to which the value of a user metric is outside a predefined metric range and identifying if the value of the user metric is above the predefined metric range or below the predefined metric range.

In many exemplary embodiments of the present invention, determining whether the user metric vector is outside the metric space is a function of multiple individual comparisons between metric values and metric ranges. In various alternative embodiments of the present invention, different criteria are used to identify the number of metric values that must be outside their corresponding metric ranges, or the degree to which any metric value is outside its corresponding metric range to determine that the user metric vector is outside the metric space. In some embodiments using a strict criteria for determining if a user metric vector is outside a user metric space, if only one metric value is outside its corresponding metric range, then the user metric vector is determined to be outside the metric space. In other embodiments, using less strict criteria for determining if a user metric vector is outside a user metric space, a user metric vector is determined to be outside the user metric space if all of the metric values of the user metric vector are outside their corresponding metric ranges by a certain degree. In various embodiments, the number of metric values that must be outside their corresponding metric ranges, or the degree to which a metric must be outside its corresponding metric range to make a determination that the user metric vector is outside the metric space will vary, all such methods of determining whether a user metric vector is outside a metric space are well within the scope of the present invention.

The second illustrated method of determining (608) that the user metric vector (606) is outside the user metric space (610) illustrated in FIG. 11 includes calculating (810) a metric vector value (812) and calculating (814) a metric space value (815) and comparing (818) the metric vector value (812) to the metric space value (816). One way of calculating a metric vector value is by using a predetermined formula to identify a single value that is a function of the metric values of the user metric vector. In one exemplary embodiment of the present invention, calculating a metric vector value includes averaging the metric values of the user metric vector. In another example embodiment, calculating a metric vector value includes prioritizing certain kinds of metrics and using a weighted average based on the priority of the metric to calculate a metric vector value.

In some exemplary embodiments, calculating (814) a metric space value (815) includes using a predetermined formula to determine a metric space value that is a function of the minimum and maximum values of each metric range of the user metric space. In one example embodiment, calculating a metric space value includes finding the center point of the minimum and maximum value of the each metric range and then averaging the center points.

The illustrated method includes comparing (818) the metric space value (815) and the metric vector value (812). In various embodiments of the present invention, how the metric vector value and the metric space value are compared to determine whether the metric vector is outside the metric space will vary. In one example embodiment, the metric vector value is subtracted from the metric space value. If the result of the subtraction is within a predetermined range, then the user metric vector is determined to be within the metric space. In the same example, if the result of the subtraction is not within the predetermined range, then the metric vector value is not determined to be within the metric space.

The illustrated methods of FIG. 11 are provided for explanation and not for limitation. There are many other ways metric ranges and metric values can be compared, combined, manipulated, or otherwise used to make a determination that a user metric vector is outside a metric space. All such ways of comparing, combining, manipulating, or otherwise using metric values and metric ranges to make a determination that a user metric vector is outside a metric space are within the scope of the present invention.

Figure 12:
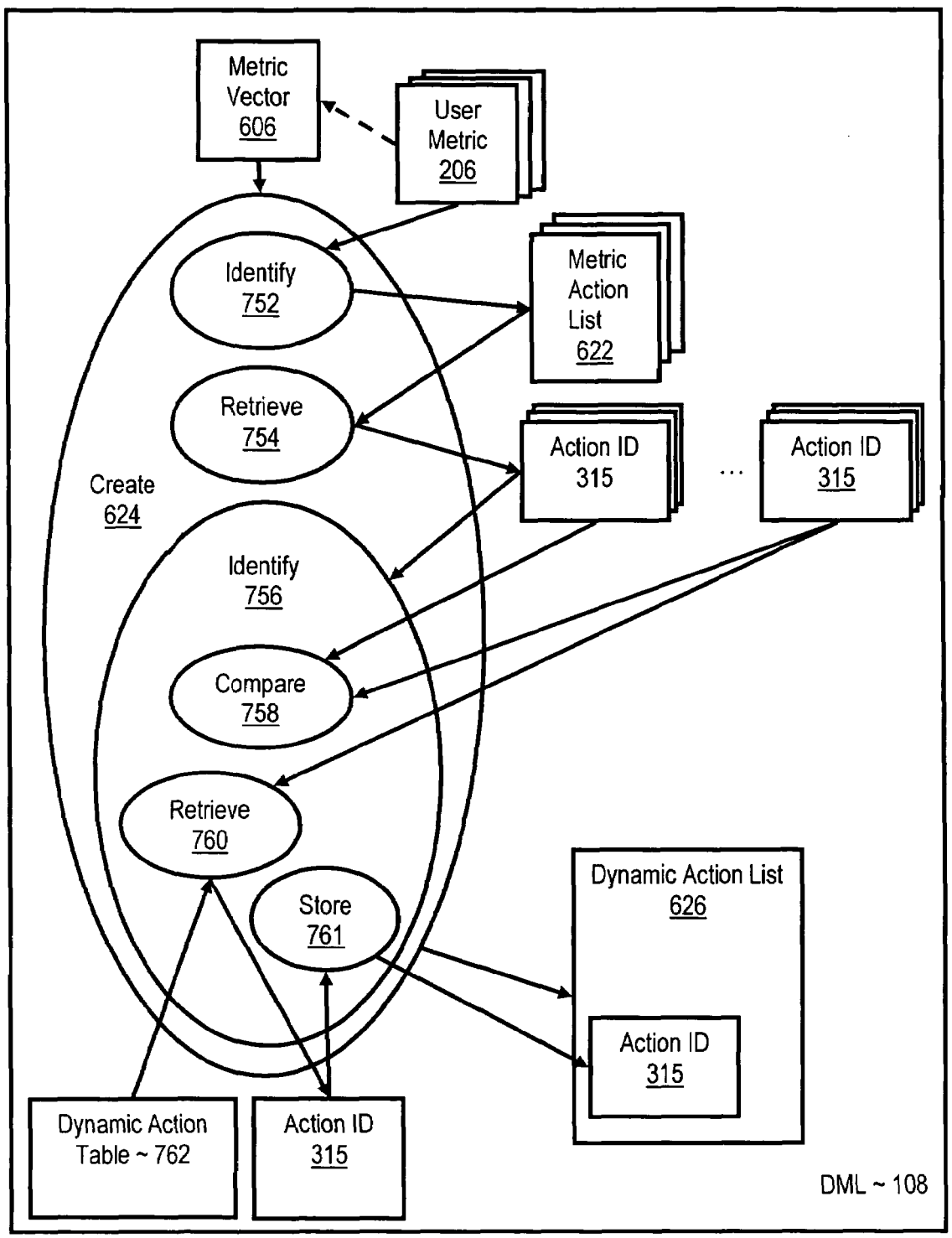
FIG. 12 is a data flow diagram illustrating an exemplary method of creating a dynamic action list.

FIG. 12 is a data flow diagram illustrating an exemplary method of creating (624), in dependence upon the user metric vector (606), a dynamic action list (626). Typical dynamic action lists include action IDs identified dynamically in dependence upon the action IDs included within metric action lists associated with the particular metrics of 10 a user's metric vector that are outside their corresponding metric ranges of the user's metric space. Creating such a dynamic action list advantageously provides a set of action IDs tailored to administer devices in response to the user's current condition.

In the method of FIG. 12, creating (624), in dependence upon the user metric vector (606), a dynamic action list (626) includes identifying (752) a metric action list (622) for each user metric (206) of the user metric vector (606) having a value that is outside a metric range (210) of the user metric space (610). In many examples of the method of FIG. 12, identifying (752) a metric action list (622) for each user metric (206) that is outside its corresponding a metric range (210) includes retrieving a reference to the metric action list from a metric object previously identified as being outside its corresponding metric range when the user metric vector was determined to be outside the user metric space. The metric objects outside their metric ranges are, in many examples, identified when the metric objects are compared with their metric ranges to determine if the user metric vector is outside the metric space.

In many examples of the method of FIG. 12, a metric has a plurality of associated metric action lists. Each associated metric action list includes a set of action IDs for execution in dependence upon the degree and direction that the value of the metric is outside the metric range. In some examples of the method of FIG. 12 therefore, identifying (752) a metric action list (622) for each user metric (206) of the user metric vector (606) having a value that is outside a metric range (210) of the user metric space (610) includes identifying a metric list in dependence upon a degree to which the value of each user metric of the user metric vector is outside a metric range of the user metric space. In another example of the method of FIG. 12, identifying (752) a metric action list (622) for each user metric (206) of the user metric vector (606) having a value that is outside a metric range (210) of the user metric space (610) includes identifying a metric list in dependence upon a direction that the value of each user metric of the user metric vector is outside a metric range of the user metric space.

In the method of FIG. 12, creating (624), in dependence upon the user metric vector (606), a dynamic action list (626) includes retrieving (754) at least one action ID (315) from each metric action list (622). Some metric action lists include a plurality of action IDs and therefore many examples of the method of FIG. 12 include retrieving a plurality of action IDs from the metric action lists associated with each metric having a value outside its corresponding metric range.

In the method of FIG. 12, creating (624), in dependence upon the user metric vector (606), a dynamic action list (626) includes identifying (756) at least one action ID (315) for inclusion in the dynamic action list (626) in dependence upon the action IDs (315) retrieved from the metric action lists (622). In many examples of the method of FIG. 12, identifying (756) at least one action ID (315) for inclusion in the dynamic action list (626) in dependence upon the action IDs (315) retrieved from the metric action lists (622) includes identifying an action ID retrieved directly from the metric action lists themselves for inclusion in the dynamic action list. That is, in some examples of the method of FIG. 12 the same action ID retrieved from a metric action list is included in the dynamic action list.

In the method of FIG. 12, identifying (756) at least one action ID (315) for inclusion in the dynamic action list (626) in dependence upon the action IDs (315) retrieved from the metric action lists (622) includes comparing (758) the action IDs (315) of the metric action lists (622) and omitting repetitious actions. In some examples of the method of FIG. 12, omitting repetitious actions includes determining that the same action ID is included in more than one metric action list. In such examples, creating a dynamic action list includes identifying metric action lists having the same action IDs and including the action ID only once in the dynamic action list.

In the method of FIG. 12, identifying (756) at least one action ID (315) for inclusion in the dynamic action list (626) in dependence upon the action IDs (315) retrieved from the metric action lists (622) includes retrieving (760) an action ID (315) from a dynamic action table (762) in dependence upon at least one action ID of the metric action lists. In many examples of the method of FIG. 12, a dynamic action table (762) is a data structure including action IDs indexed by other action IDs. That is, the dynamic action table is a data structure designed to index predetermined action IDs for inclusion in the dynamic action list in dependence upon the action IDs retrieved from the metric action lists.

Such a dynamic action table therefore is in many examples of the method of FIG. 12 designed to identify conflicting actions retrieved from the metric action lists, identify superseding actions retrieved from the metric action list, as well as identify further actions not included in the metric action lists. In some examples of the method of FIG. 12, identifying (756) at least one action ID (315) for inclusion in the dynamic action list (626) in dependence upon the action IDs (315) retrieved from the metric action lists (622) includes omitting conflicting actions. In many examples of the method of FIG. 12 a dynamic action table is used to identify action IDs that have been predetermined to conflict. For example, an action ID included in one metric action list that identifies a device controlling action to turn on a ceiling fan conflicts with an action ID identifying a device controlling action to turn off the same ceiling fan. Such conflicting action IDs are omitted from the dynamic action list.

In some examples of the method of FIG. 12, identifying (756) at least one action ID (315) for inclusion in the dynamic action list (626) in dependence upon the action IDs (315) retrieved from the metric action lists (622) includes omitting superseded actions. A superseded action is an action that when executed administers the same device in the same direction as another superseding action, but administers the device to a lesser degree than the other superseding action. That is, an action is superseded when another action administers the same device to a greater degree such that the execution of superseded action is cloaked by execution of the superseding action. For example, the execution of an action ID that results in changing the value of a current attribute of a ceiling fan from "5" to "4" is superseded by the execution of an action ID that results in changing the same ceiling fan attribute from "5" to "2." In many examples of the method of FIG. 12, a dynamic action table is used to identify action IDs that have been predetermined to supersede other actions IDs. Many examples of the method of FIG. 12 include omitting the superseded action IDs from the dynamic action list and including the superseding action ID.

In the method of FIG. 12, identifying (756) at least one action ID (315) for inclusion in the dynamic action list (626) in dependence upon the action IDs (315) retrieved from the metric action lists (622) includes identifying an action ID for inclusion in the dynamic action list that is not included in any of the identified metric action lists (622). In many examples of the method of FIG. 12, an action ID identified by a lookup in the dynamic action table (762) is not included in any of the identified metric action. In some of these examples, the dynamic action table is populated with action IDs that have been predetermined to affect the same user condition when executed as other action IDs. Such a dynamic action table is indexed to identify an action ID for execution when one or more other action IDs are retrieved from the metric action lists. In this way, dynamic action tables advantageously provide a vehicle for identifying and executing more actions to affect the user's current condition.

For further explanation of identifying action IDs that are not included in any metric action list associated with a user metric outside its corresponding range, the following example is provided. Two user metrics of a user metric vector are above their corresponding metric ranges of the user's metric space. The first metric represents body temperature and has a first action ID in its associated metric action list that when executed results in turning on a ceiling fan. The second metric represents heart rate and has a second action ID in its associated metric list that when executed turns on an air conditioner. A lookup in a dynamic action table in dependence upon the first action ID and the second action ID retrieves a third action ID that is not included in either metric action list of either metric. Executing the third action ID results in turning on the ceiling fan, turning on the air conditioner, and drawing automated window curtains. The added action of drawing automated window curtains is predetermined to affect the same user condition as turning on the air conditioner and the ceiling fan. A lookup on the dynamic action table identifies the third action ID for inclusion in the dynamic action list in dependence upon the first and second action IDs.

Administering Devices With Domain State Object

Figure 13:
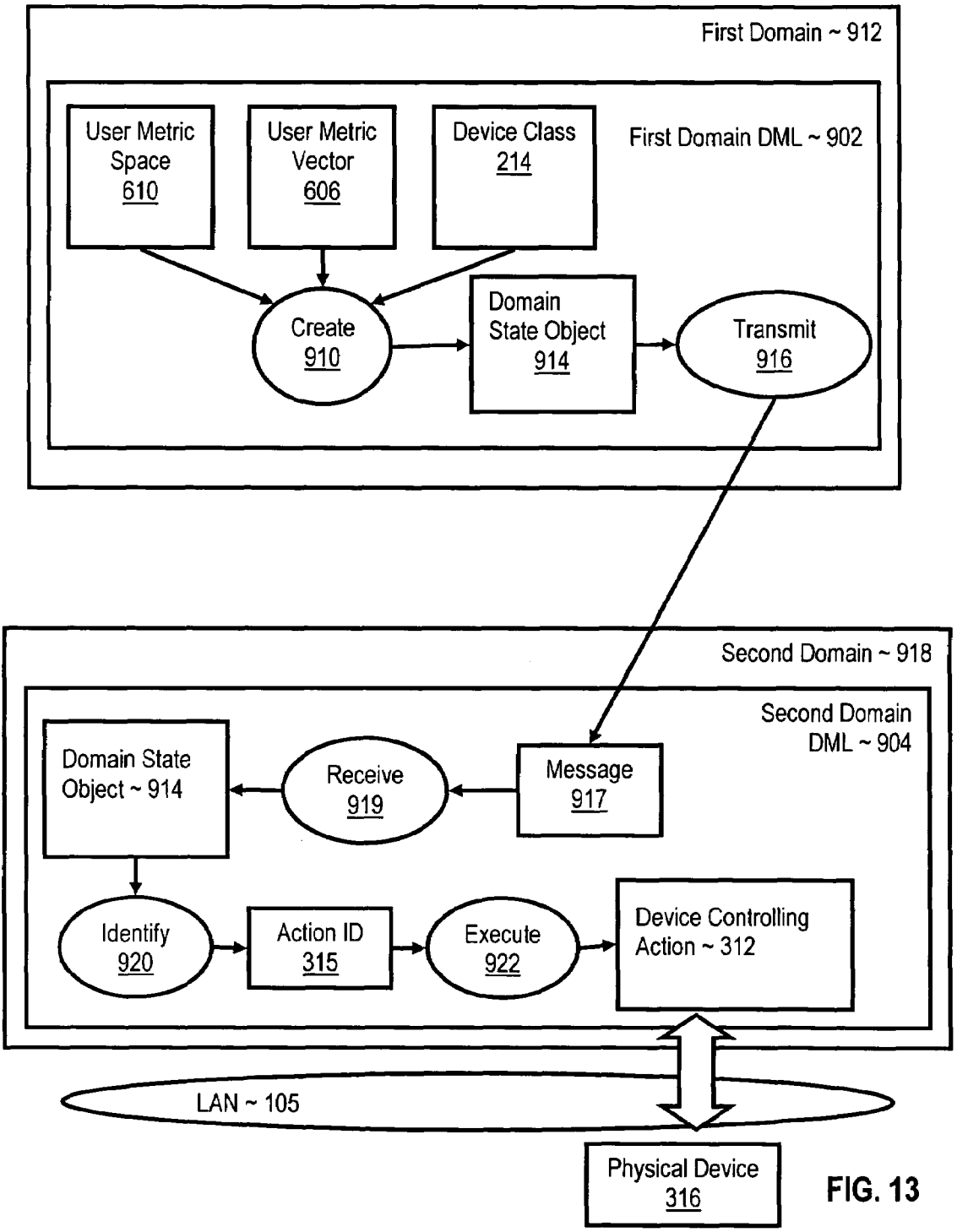
FIG. 13 is a data flow diagram illustrating an exemplary method of administering devices in accordance with the present invention.

FIG. 13 is a data flow diagram illustrating an exemplary method for administering devices. The method of FIG. 13 includes creating (910), in a first domain (912), a domain state object (914). As discussed above, the term "domain" in this specification means a particular networked environment. Examples of various domains include home networks, car networks, office network, and others as will occur to those of skill in the art.

The exemplary first domain (912) of FIG. 13 includes a first domain DML (902). In many examples of the method of FIG. 13, the first domain DML (902) includes application software useful in implementing methods of administering devices in accordance with the present invention. In some examples of the method of FIG. 13, first domain DML includes OSGi compliant application software, and is therefore implemented as services or a group of services packaged as a bundle installed on a services framework in the first domain. In this specification, DMLs are often discussed in the context of OSGi. However, the discussion of OSGi is for explanation and not for limitation. In fact, DMLs according to various embodiments of the present invention can be implemented in any programming language, C, C++, COBOL, FORTRAN, BASIC, and so on, as will occur to those of skill in the art, and DMLs developed in languages other than Java are installed directly upon an operating system or operating environment rather than a JVM.

In many examples of the method of FIG. 13, a domain state object (914) is a data structure including information describing the state of the first domain and information describing the current condition of the user in the first domain (912). In various alternative embodiments of the method of FIG. 13, the specific information contained in a domain state object will vary. Typical domain state objects however include information identifying devices within the first domain and the state or current value of an attribute of those devices. Typical domain state objects also include information describing a user's current condition within the first domain such as the user's current metric vector and the user's current metric space.

In many examples of the method of FIG. 13, creating (910), in a first domain (912), a domain state object (914) includes calling member methods in a domain state service object (Reference 929 on FIG. 3), such as createDomainStateObject( ) (Reference 927 on FIG. 3). In some examples of the method of FIG. 13, createDomainStateObject( ) returns to its caller a domain state object including at least one device in the first domain, the current value of an attribute of that device, the user's current metric vector, and the user's current metric space.

The method of FIG. 13 includes transmitting (916) the domain state object (914) from the first domain (912) to a second domain (918). A second domain means any particular networked environment other than the first domain. That is, another networked environment. Typical second domains, such as the second domain of FIG. 13, include a second domain DML. The second domain DML includes application programming useful in implementing methods of administering devices in accordance with the present invention.

In many examples of the method of FIG. 13, transmitting (916) the domain state object from the first domain to a second domain includes converting the domain state object to a message (917) and transmitting the message (917) from the first domain (917) to the second domain (918). In some examples, the domain state object is transmitted from the first domain to the second domain as a message using any of a number of protocols that will occur to those of skill in the art such as HTTP, Bluetooth, WAP or any other protocol that will occur to those of skill in the art.

In some examples of the method of FIG. 13, transmitting (916) the domain state object (914) from the first domain (912) to a second domain (918) includes transmitting the domain state object from the first domain to the second domain through a mobile sensor worn by a user. In many examples of the present invention, the domain state object is downloaded to a mobile sensor, such as the metric sensor worn by the user. The user then transports the mobile sensor containing the domain state object from the first domain to the second domain.

The method of FIG. 13 includes receiving (919) a domain state object (914). Many examples of the method of FIG. 13 include receiving (919) a domain state object (914) from a mobile sensor worn by a user when the user enters the second domain. In many examples of the present invention, receiving (919) a domain state object includes receiving a message transmitted using a protocol such as an HTTP, WAP, or any other protocol and converting the message to the domain state object.

The method of FIG. 13 includes identifying (920) an action (315) in dependence upon the domain state object (914) and executing (922) the action (315). An action typically includes one or more computer programs, subroutines, or member methods that when executed, control one or more devices. Actions are typically implemented as object oriented classes and manipulated as objects or references to objects. In many examples of the method of FIG. 13, an action object calls member methods in a device class to affect current attributes of the physical device. In many examples of the method of FIG. 13, executing an action is carried out using switch statements, hash tables, and list objects as described above with reference to FIG. 6 and FIG. 9.

In many examples of the method of FIG. 13, the actions identified in dependence upon the domain state object are actions designed to administer devices in a second domain that are similar to devices included in the domain state object in a manner consistent with the values of the attributes of the devices in the domain state object. The actions identified in dependence upon the domain state object are actions designed to set up the second domain for the user in a manner consistent with the first domain.

Consider the following use case. A user has a cold causing particular user metrics to be outside of their corresponding metric ranges. As a result of these metrics being outside their corresponding metric ranges, actions are identified and executed in the user's home domain changing the settings for the home air conditioner and the homes lights. These actions set a temperature and the light level in the home domain.

The user leaves his home domain to go to work. Upon leaving the home domain, the user's home DML downloads to a mobile sensor a domain state object. The domain state object includes the device IDs and values of the attributes of the user's home air conditioner and the user's home lighting.

The user enters the user's office domain. The office domain's DML receives the domain state object created in the user's home domain and identifies actions that when executed administer the air conditioner in the user's office and the lights in the user's office to provide a similar temperature and light level in the office as in the user's home.

In the previous use case, the home domain and the office domain were similar types of domains containing similar devices. In many examples of the method of FIG. 13 however, the first domain is a different kind of domain than the second domain containing different devices. Despite being different kinds of domains that contain different devices, often a first domain and a second domain will have similar devices that affect a user's condition similarly. For example, a user may leave a home domain and enter a car domain. While many of the devices in a car are usually not present in a home, there are similar devices and even the same devices. Both domains can and often do include an air conditioner, a fan, a radio, a CD player, a television, a DVD player, and a phone as well as other devices. The air conditioner in a car is not the same as an air conditioner in a home, but they are similar because they both affect the same aspects of user condition. By the same token, an air conditioner is similar to a fan, a radio is similar to a CD player, and so on.

Figure 14:
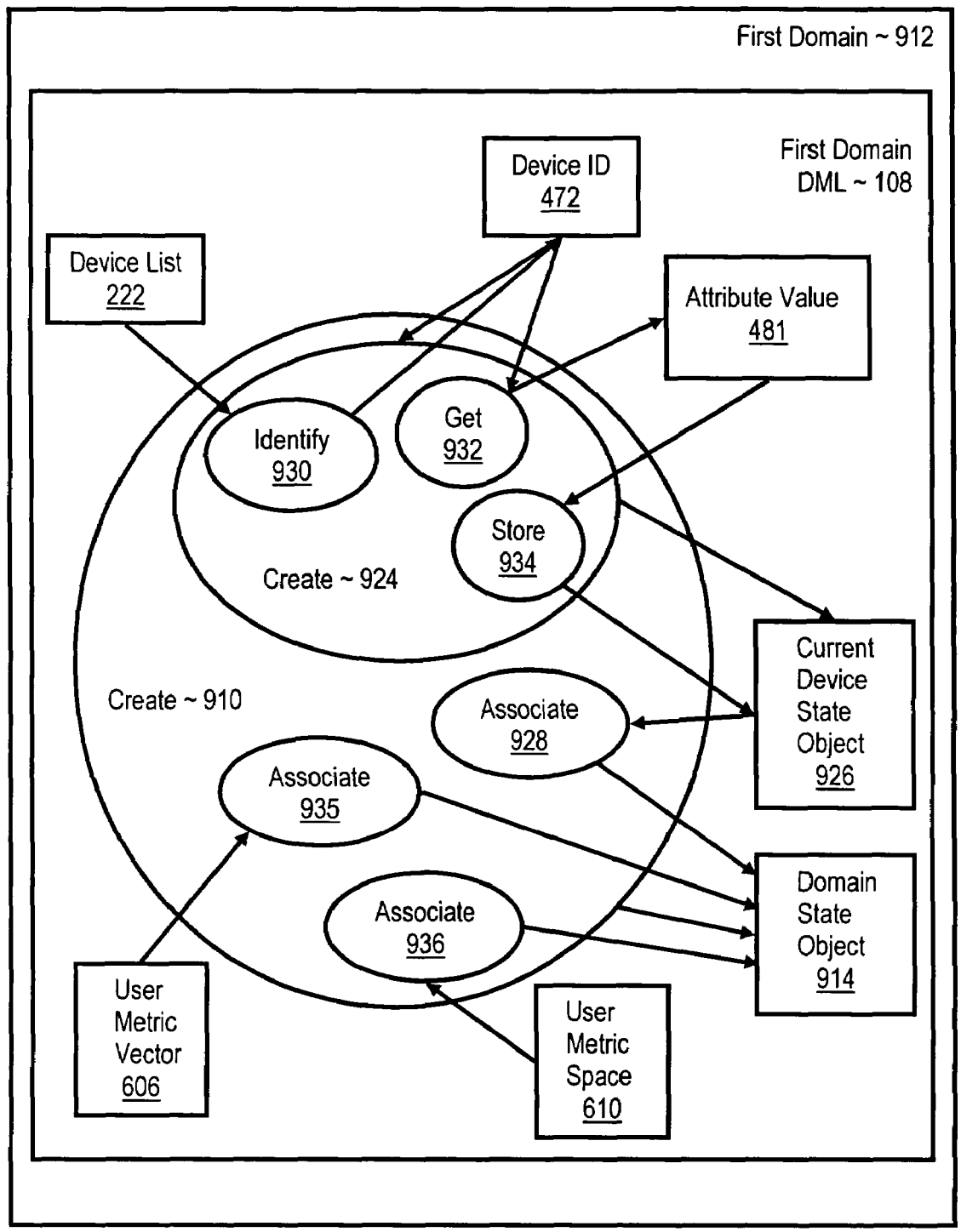
FIG. 14 is a data flow diagram illustrating an exemplary method of creating a domain state object.

FIG. 14 is a data flow diagram illustrating an exemplary method of creating (910), in a first domain (912), a domain state object (914). In many examples of the method of FIG. 14, creating (910), in a first domain (912), a domain state object (914) includes creating (924) a current device state object (926). A current device state object (926) is, in many examples, a data structure that includes at least one device ID identifying a device in the first domain and the current value of an attribute of that device. An example of a value of a current attribute of a device is an indication that the device is "on" or "off." Other examples of values of device attributes include values indicating a particular setting of a device.

In the method of FIG. 14, creating (924) a current device state object (926) includes identifying (930) a device (472) in the first domain (912). One way of identifying at least one device in the first domain includes identifying a device ID included in a device list associated with a metric action list. As discussed above, each user metric of the metric vector has an associated metric action list including action IDs identifying an action that administer one or more devices. The devices that the action object administers are included in a device list associated with the action object. In some examples of the method of FIG. 14 therefore, identifying a device in the first domain includes retrieving a device list (222) from each an action object (315) associated with the user's metric vector, and retrieving the device IDs from the device lists.

In the method of FIG. 14, creating (924) a current device state object (926) includes getting (932) the value of a current attribute (481) of the device. In many examples of the method of FIG. 14, getting a device attribute includes calling accessor methods in a device class for the identified device in the first domain. Some devices in the first domain may support more than one attribute, and therefore, some examples of the method of FIG. 14 include getting the current value of each attribute that the device supports.

In the method of FIG. 14, creating (924) a current device state object (926) includes storing (934) the identified device ID and the current attribute (481) in the current device state object (926). In many examples of the method of FIG. 14, storing the device ID and current attribute in the current device state object includes calling member methods in the current device state object such as CurrentDeviceStateObject.add( ) (reference 921 on FIG. 3). When the device supports more that one attribute, many examples of the method of FIG. 14 include storing, in the device state object, the current value of each attribute that the device supports.

In many examples of the method of FIG. 14, the user metric vector has a plurality of associated action objects. In such examples, a plurality of devices in the first domain are therefore administered by those action objects. In many examples of the method of FIG. 14, creating a current device state object includes identifying a plurality of devices in the first domain, getting a plurality of current attributes of those plurality of devices, and storing a plurality of device IDs identifying the devices and the current values of attributes of those devices in the current device state object.

In the method of FIG. 14, creating (910), in a first domain (912), a domain state object (914) includes associating (928) the current device state object (926) with the domain state object. In many examples of the method of FIG. 14, associating the current device state object with the domain state object includes providing the domain state object with a reference to the current device state object.

In the method of FIG. 14, creating (910), in a first domain (912), a domain state object (914) comprises associating (935) a user metric vector (606) with the domain state object (914) and associating (936) a user metric space (610) with the domain state object (914). In many examples of the method of FIG. 14, associating a user metric vector with the domain state object includes providing the domain state object with a reference to the user's current metric vector. In many examples of the method of FIG. 14, associating a user metric space with the domain state object includes providing the domain state object with a reference to the user's current metric space.

Figure 15:
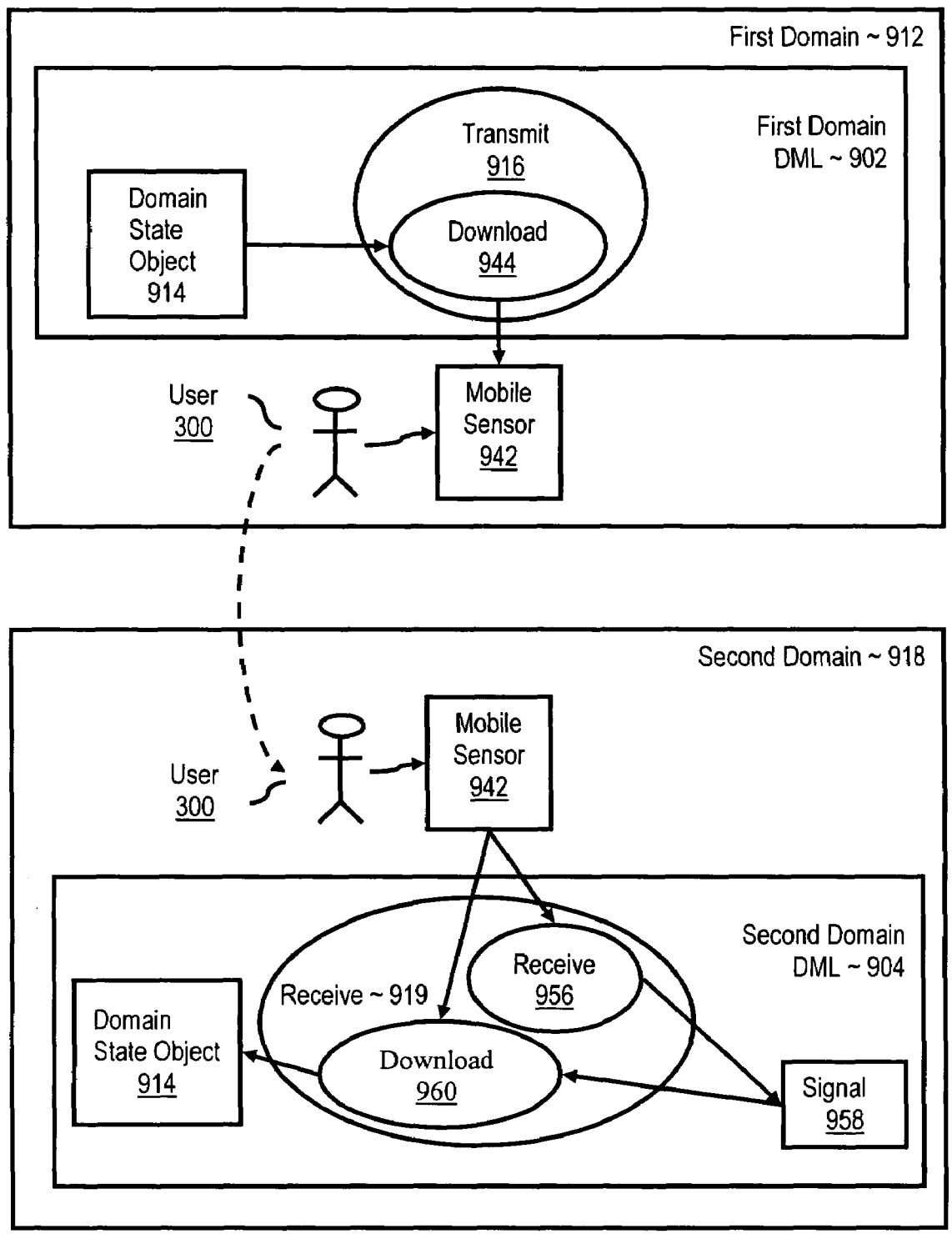
FIG. 15 is a data flow diagram illustrating an exemplary method of transmitting a domain state object and an exemplary method of receiving a domain state object.

FIG. 15 is a data flow diagram illustrating an exemplary method of transmitting (916) the domain state object (914) from the first domain (912) to a second domain and exemplary method of receiving (919) a domain state object (914).

In the method of FIG. 15, transmitting (916) the domain state object (914) from the first domain (912) to a second domain includes downloading (944) the domain state object (914) to a mobile sensor (942). In many examples of the method of FIG. 15, the mobile sensor (942) is a wearable sensor capable of receiving and storing the domain state object. In some examples of the method of FIG. 15, the mobile sensor (942) is also a user's metric sensor.

In some examples of the method of FIG. 15, downloading the domain state object is a result of executing an action object. For example, an action ID may be identified and executed when a user's metric for location is outside a set of metric ranges that identify the perimeter of the user's home. An action list associated with the location metric includes an action ID the when executed downloads a domain state object to the user's mobile sensor.

After downloading the domain state object to the user's mobile sensor, in the method of FIG. 15, a user takes the mobile sensor from the first domain to the second domain. By downloading the domain state object to the mobile sensor the first domain and the second domain are independent and require no coupling for data communication to transmit the domain state object from the first domain to the second domain.

The method of FIG. 15 includes receiving the domain state object. In the method of FIG. 15, receiving (919) a domain state object (914) includes receiving (956) a signal (958) to download the domain state object (914) from a mobile sensor (942) and downloading (960) the domain state object (914) from the mobile sensor (942). In many examples of the method of FIG. 15, the mobile sensor transmits a signal including an ESN or other sensor ID and an address on the mobile sensor where the domain state object is located. Upon entering the second domain, the second domain DML receives the signal from the mobile sensor containing the sensor ID and the address of the domain state object. After receiving the signal to download the domain state object, the DML downloads the domain state object from the address transmitted by the mobile sensor.

Figure 16:
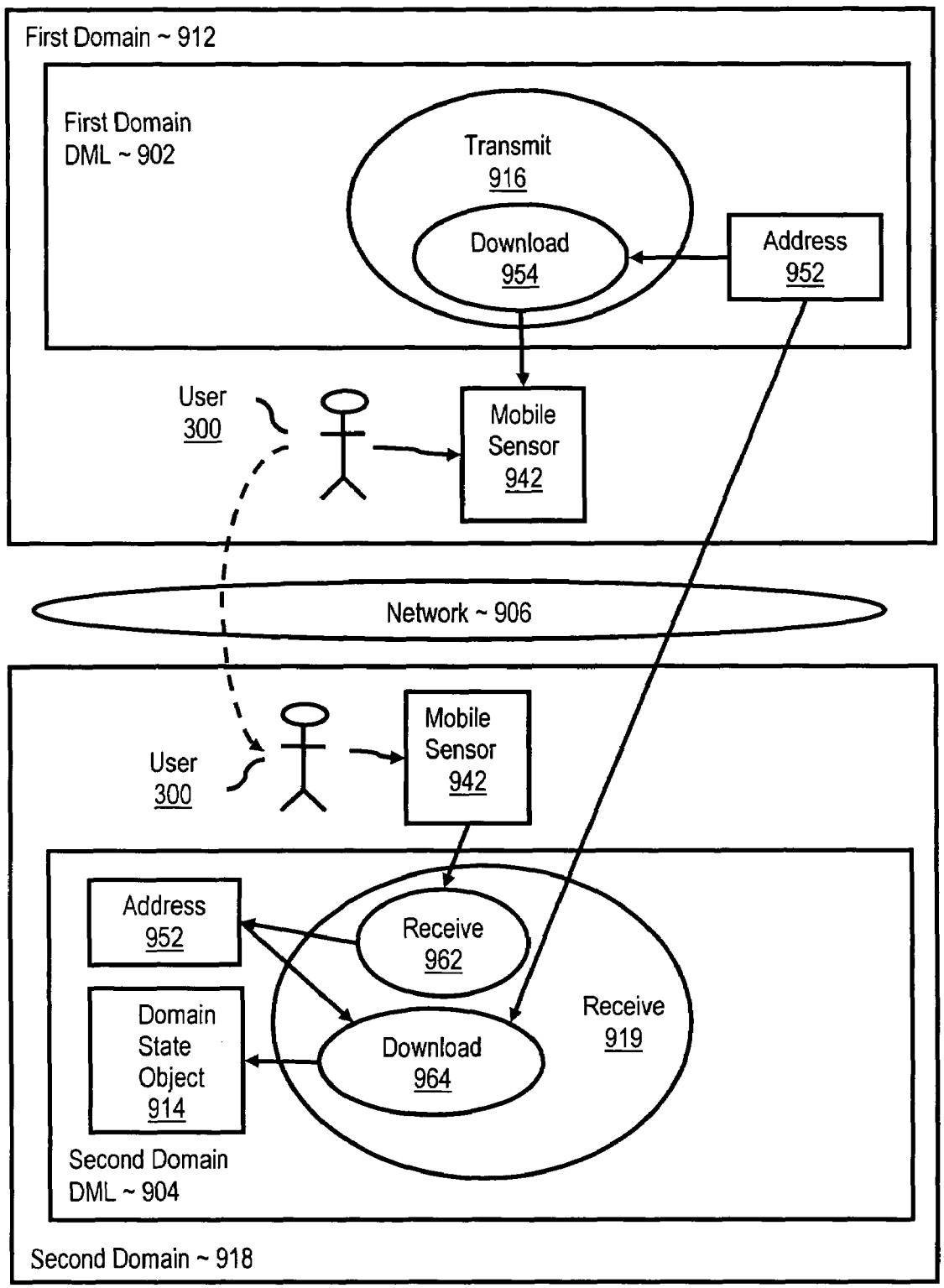
FIG. 16 is data flow diagram illustrating another exemplary method of transmitting a domain state object and another exemplary method of receiving a domain state object.

FIG. 16 is a data flow diagram illustrating another exemplary method of transmitting (916) the domain state object (914) from the first domain (912) to the second domain and another exemplary method of receiving the domain state object. In the method of FIG. 16, transmitting (916) the domain state object (914) from the first domain (912) to a second domain includes downloading (954) the address (952) of the domain state object (914) to the mobile sensor (942). As with the example of FIG. 15, in some examples of the method of FIG. 16, downloading the address of the domain state object to the mobiles sensor is carried out by executing an action such as an action identified when the user's location exceeds a predetermined range or set of ranges.

One advantage to downloading the address of the domain state object to the mobile sensor rather than the downloading the domain state object itself is that less memory is required on the mobile device. However, by downloading only the address, the second domain must be coupled for data communications with the address where the domain state object is located. The address maybe located on in the first domain, on an ISP, or any other location that will occur to those of skill in the art.

The method of FIG. 16 includes receiving the domain state object. In the method of FIG. 16, receiving (919) the domain state object (914) includes receiving (962) an address (952) of the domain state object (914) from a mobile sensor (942) and downloading (964) the domain state object (914) from the address (952). In many examples of the method of FIG. 16, the mobile sensor transmits a signal including an ESN or other sensor ID and the address where the domain state object is located. The address may be located in the first domain, on an ISP, or any other location that will occur to those of skill in the art. Upon entering the second domain, the second domain DML receives the signal from the mobile sensor containing the sensor ID and the address of the domain state object. After receiving the signal to download the domain state object, the DML downloads the domain state object from the address transmitted by the mobile sensor.

Figure 17:
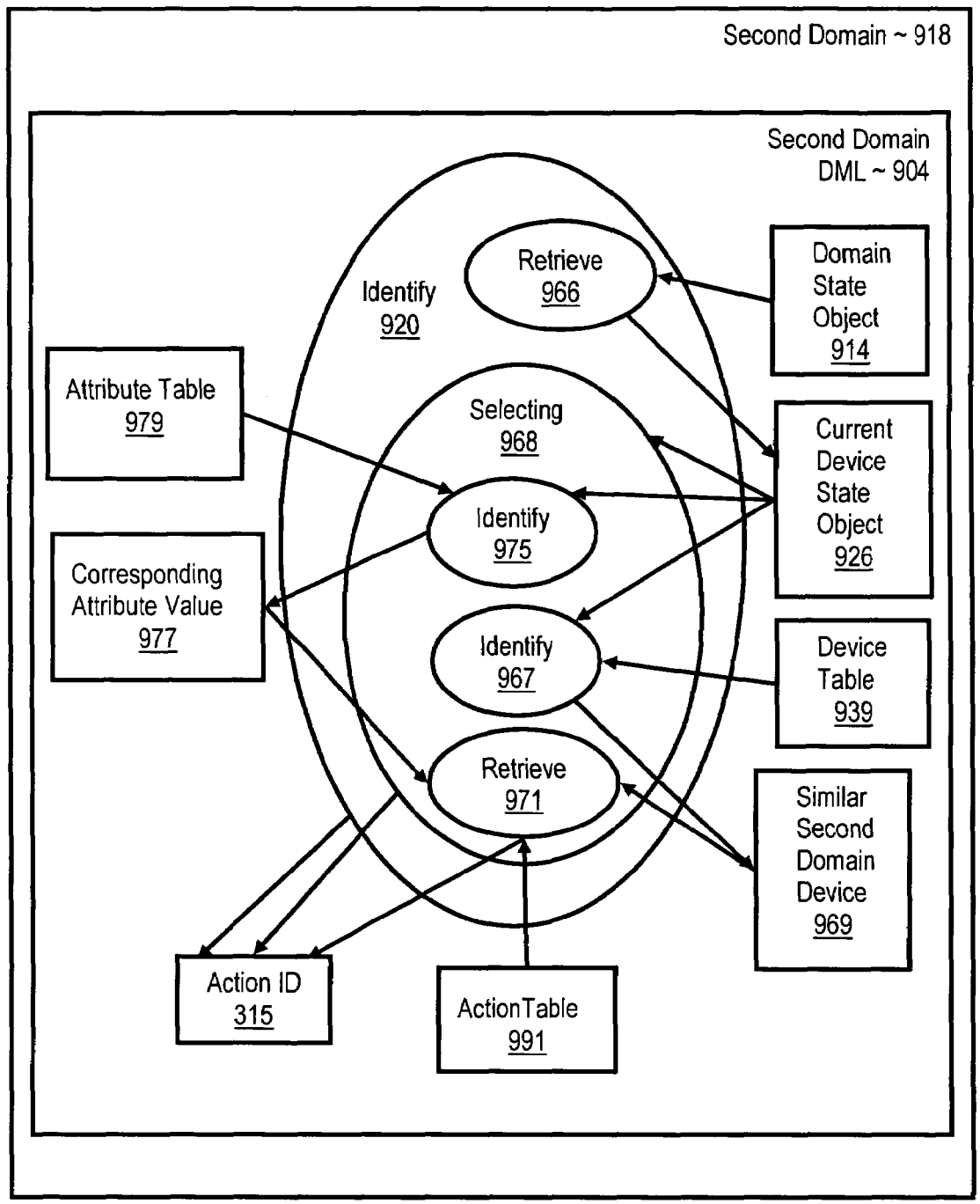
FIG. 17 is a data flow diagram illustrating an exemplary method of identifying an action in dependence upon the domain state object.

FIG. 17 is a data flow diagram illustrating an exemplary method of identifying (920) an action (315) in dependence upon the domain state object (914). In the method of FIG. 17 identifying (920) an action (315) in dependence upon the domain state object (914) includes retrieving (966) a current device state object (926) from the domain state object (914). As discussed above, a current device state object (926) is a data structure including device IDs identifying devices in the first domain and the then-current values of attributes of those devices when the current device state object was created in the first domain.

In the method of FIG. 17, identifying (920) an action (315) in dependence upon the domain state object (914) includes selecting (968) an action ID (315) in dependence upon the current device state object (926). In many examples of the present invention, selecting an action ID in dependence upon the current device state object includes selecting an action ID designed to administer devices in the second domain that are similar to devices in the first domain and administer them such that the values of their attributes correspond to the values of similar device in the first domain. In many examples of the method of FIG. 17, a plurality of action IDs are selected in dependence upon the current device state object.

In the method of FIG. 17, selecting (968) an action ID (315) in dependence upon the current device state object (926) includes identifying (967) a device in the second domain that is similar to a device included in the current device state object (926). In many examples of the method of FIG. 13, a device in the second domain that is 'similar' to a device included in the current device state object is a device that affects user condition in a manner similar to the device included in the current device state object. Two devices do not have to be the same type of devices to be similar. For example, a desk lamp may be similar to an overhead light, a fan may be similar to an air conditioner, radio may be similar to a CD player. Each of these devices differ in operation, however, each may affect user condition similarly. Furthermore, in some examples of the method of FIG. 17, a plurality of devices may be similar to a single device. For example, a car heater and car seat heaters together may operate to affect user condition in a manner similar to a heater in a home.

In many examples of the method of FIG. 17, identifying (967) a device in the second domain that is similar to a device included in the current device state object (926) includes comparing the device IDs of the current device state object with a device table (939). A device table (939) is a data structure including device IDs indexed by other device IDs. The device table includes device IDs in the second domain that are predetermined to be similar to other device IDs. A lookup on the device table facilitates identifying a device ID in the second domain that is similar to a device included in the current device state object.

In the method of FIG. 17, selecting (968) an action ID (315) in dependence upon the current device state object (926) includes identifying (975) a corresponding attribute value (977). A corresponding attribute value is the value of an attribute of a device in the second domain that corresponds with a value of an attribute of a similar device in the first domain. In many examples of the method of FIG. 17, a corresponding value of an attribute of the similar device is an attribute setting for the similar device such that the device affects user condition in a manner similar to the device included in the domain state object having its attribute value. For example, attribute value of '5' on a home an air conditioner may correspond to an attribute value of '10' on a car fan, and a value of '7' on a car air conditioner.

In many examples of the method of FIG. 17, identifying (975) a corresponding attribute value (977) includes retrieving a corresponding attribute value from an attribute table (979). In many examples of the method of FIG. 17, an attribute table is a data structure including attribute values of a particular device ID indexed by attribute values of other device IDs that are predetermined to be similar. A lookup on an attribute table facilitates identifying a particular value of an attribute that is predetermined to affect user condition in manner similar to a value of an attribute on another device.

In the method of FIG. 17, selecting (968) an action ID (315) in dependence upon the current device state object (926) includes retrieving (971), from an action table (991) an action ID in dependence upon the device in the second domain identified to be similar to the device contained in the current device state object and the corresponding attribute of that similar device. In many examples of the method of FIG. 17, the action table is a data structure including action IDs identified by the devices the action IDs administer and resulting value of the attribute the device. In many examples of the method of FIG. 17, executing the selected action includes executing the accessor methods in a device class of the similar device to the attribute of the device to an appropriate attribute identified in dependence upon the current device state object.

Figure 18:
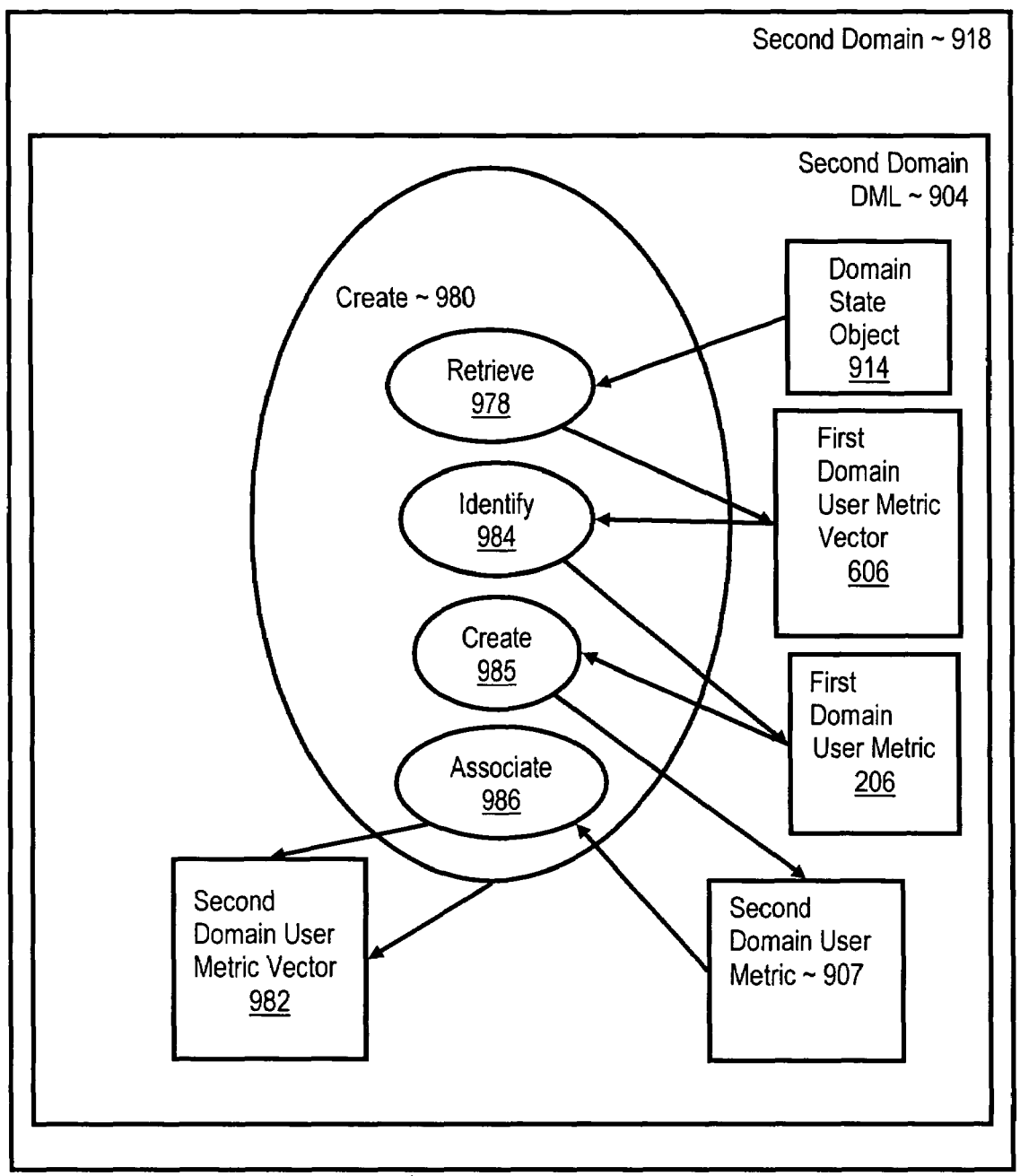
FIG. 18 is a data flow diagram illustrating an exemplary method of creating a second domain user metric vector.

FIG. 18 is a data flow diagram illustrating an exemplary method of creating (980) a second domain metric vector (982) for the second domain (918) in dependence upon the domain state object (914). In the method of FIG. 18 creating (980) a second domain metric vector (982) for the second domain (918) in dependence upon the domain state object (914) includes retrieving (978) a first domain user metric vector (606) from the domain state object (914). In many examples of the method of FIG. 18, the first domain user metric vector is the user metric vector that was current for the user when the domain state object was created in the first domain.

In the method of FIG. 18, creating (980) a second domain metric vector (982) for the second domain (918) in dependence upon the domain state object (914) includes identifying (984) a first domain user metric (206) associated with the first domain user metric vector (606). In many examples of the method of FIG. 18, identifying the first domain user metrics associated with the first domain user metric vector includes identifying the metric ID and metric value of a user metric associated with the first domain user metrics. In typical examples of the method of FIG. 18, the first domain user metric includes a plurality of disparate first domain user metrics. Many examples of the method of FIG. 18 therefore include identifying a plurality of disparate first domain user metrics.

In the method of FIG. 18, creating (980) a second domain metric vector (982) for the second domain (918) in dependence upon the domain state object (914) includes creating (985) a second domain user metric (907) in dependence upon the first domain user metric. In many examples of the method of FIG. 18, creating a second domain user metric in dependence upon the first domain user metric includes instantiating a second domain metric object having a user ID, metric ID, and metric value that is the same as the first domain metric. In some examples of the method of FIG. 18, creating a second domain user metric in dependence upon the first domain user metrics includes calling member methods in a metric service parameterized with the user ID, metric ID and metric value of the first domain user metrics. As discussed above, in many examples of the method of FIG. 18, the first domain user metric vector includes a plurality of disparate first domain user metrics and therefore, typical examples include creating a plurality of second domain user metrics in dependence upon a plurality of first domain user metrics.

In the method of FIG. 18, creating (980) a second domain metric vector (982) for the second domain (918) in dependence upon the domain state object (914) includes associating (986) the second domain user metric (206) with the second domain user metric vector. In many examples of FIG. 18, associating (986) the second domain user metric (206) with a second domain user metric vector includes providing the second domain user metric vector with a reference to the second domain user metric.

Figure 19:
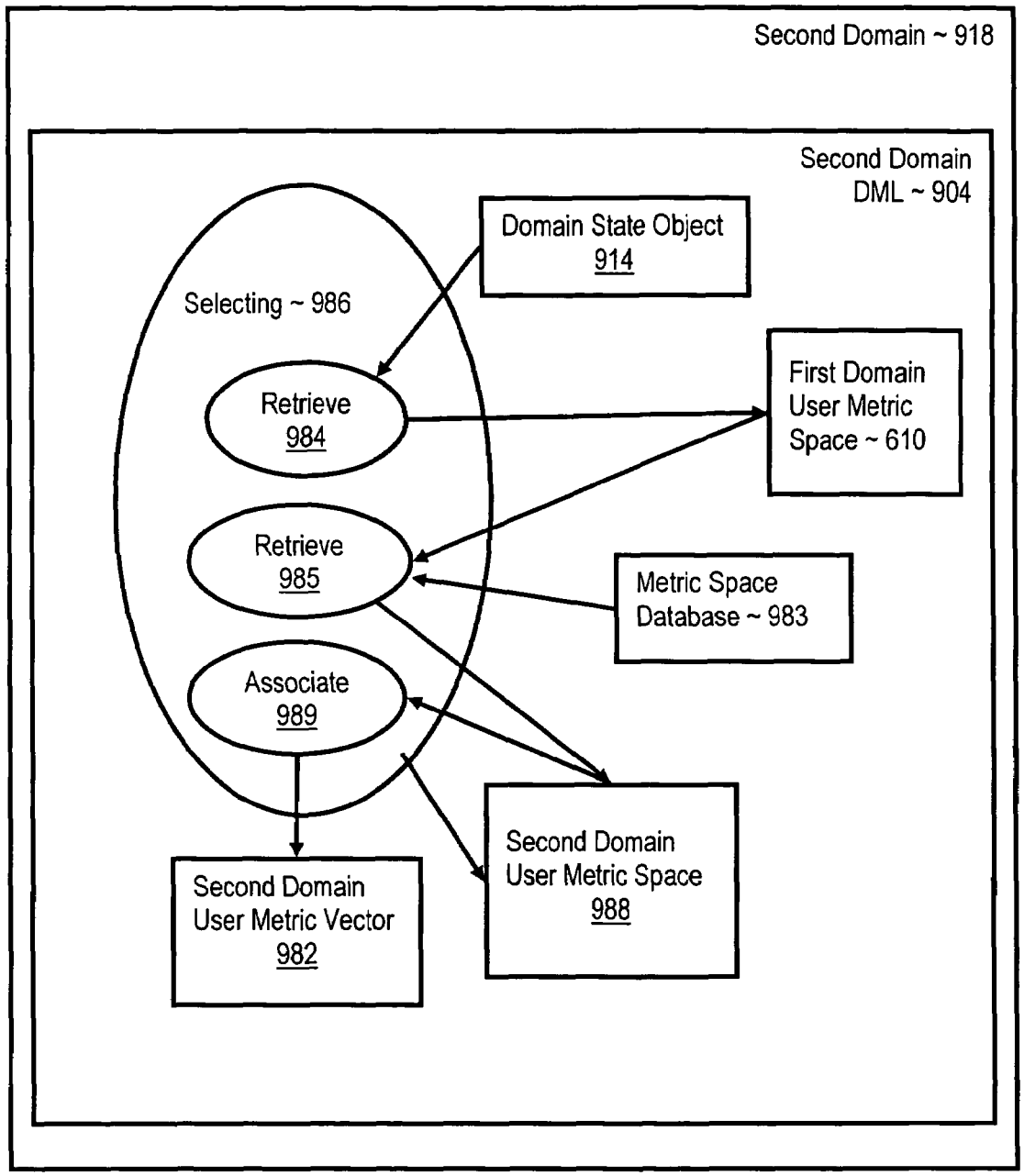
FIG. 19 is a data flow diagram illustrating an exemplary method of selecting a second domain user metric space.

FIG. 19 is a data flow diagram illustrating an exemplary method of selecting (986) a second domain user metric space (988) in dependence upon the domain state object (914). In some examples of the method of FIG. 19, the second domain metric space is a metric space having metric ranges that are appropriate for the user in the second domain. In many examples, the second domain metric space has metric ranges for the same metric IDs as the first domain metric space, but the metric ranges have different minimum and maximum values. For example, a first domain user metric space for a user's home domain may contain metric ranges for heart rate and body temperature that are different from a user's second domain metric space for a car domain. In the method of FIG. 19, selecting (986) a second domain user metric space (988) in dependence upon the domain state object (914) includes retrieving (984) a first domain user metric space (610) from the domain state object (914). In typical examples of the method of FIG. 19, the first domain metric space was the user's then-current metric space in the first domain when the domain state object was created.

In the method of FIG. 19 selecting (986) a second domain user metric space (988) in dependence upon the domain state object (914) includes retrieving a second domain user metric space from a metric space database (983) in dependence upon the first domain user metric space. In many examples of the method of FIG. 19, a metric space database (983) is a database of second domain user metric spaces that are predetermined to be appropriate for the user in the second domain indexed by other metric spaces, such as a first domain user metric space. In many examples, the metric space database includes appropriate second domain metric spaces indexed by other metric spaces having metric ranges for the same metric IDs. That is, a lookup in the metric space database in dependence upon the first domain metric space may retrieve an appropriate second domain metric space having metric ranges of the same metric ID as the first domain metric space.

In the method of FIG. 19 selecting (986) a second domain user metric space (988) in dependence upon the domain state object (914) includes associating (989) the second domain user metric space (988) with a second domain user metric vector. In many examples of the method of FIG. 19 associating (989) the second domain user metric space (988) with a second domain user metric vector includes providing the second domain user metric vector with a reference to the second domain user metric space.

Figure 20:
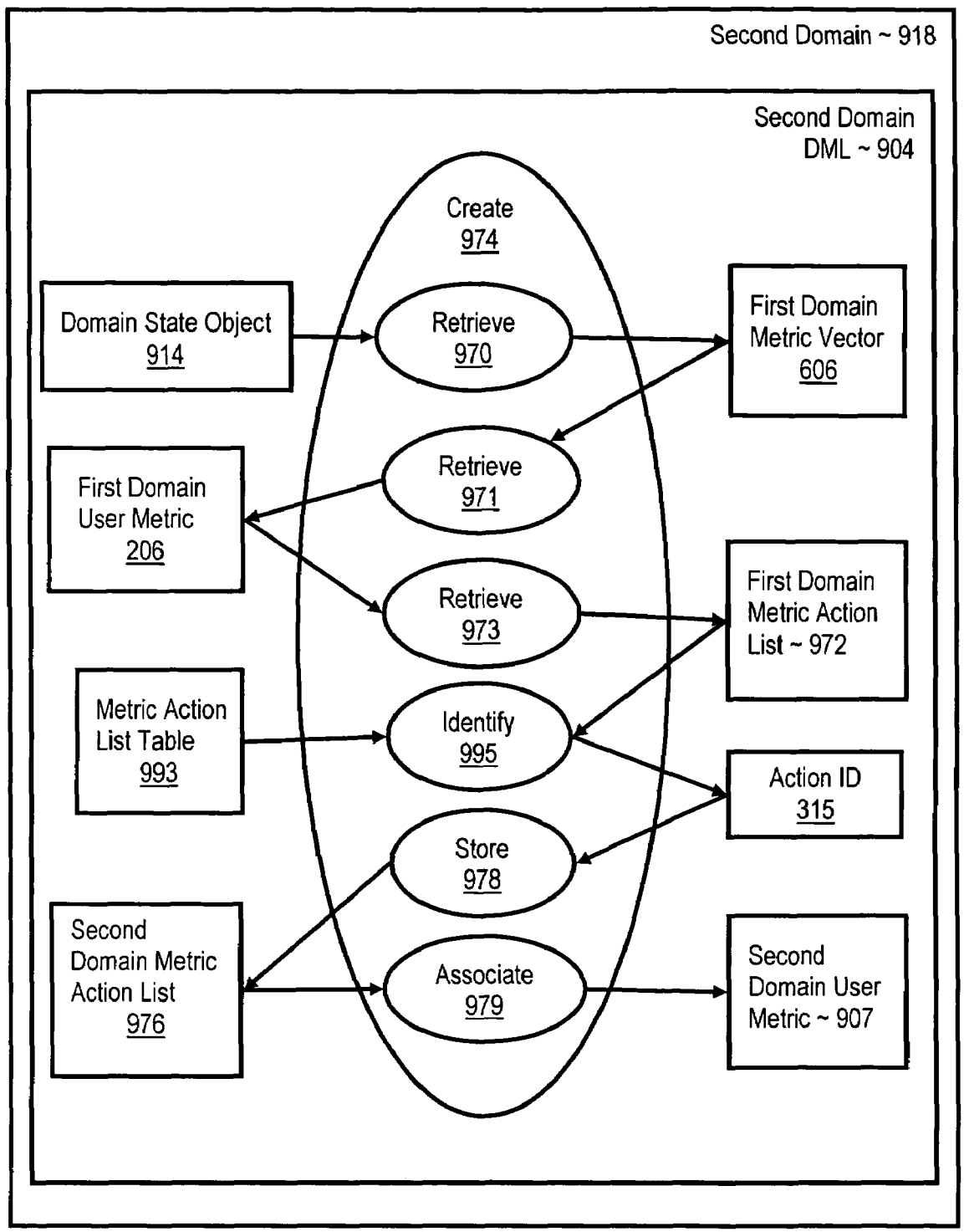
FIG. 20 is a data flow diagram illustrating an exemplary method of creating a second domain metric action list.

FIG. 20 is a data flow diagram illustrating an exemplary method of creating (974) a second domain metric action list (976) in dependence upon the domain state object (914). A second domain metric action list is a list of action IDs associated with a second domain user metrics of the user's second domain metric vector. A second domain metric action lists is used to create, in the second domain, a dynamic action list of action IDs to be executed when the user's second domain metric vector is outside the user's second domain metric space.

In many examples of the method of FIG. 20, creating (974) a second domain metric action list (976) in dependence upon the domain state object (914) includes retrieving (970), from the domain state object (914), a first domain metric vector. In typical examples of the method of FIG. 20, a first domain metric vector was the user's then-current metric vector when the domain state object was created. The first domain user metric vector typically includes a plurality of first domain user metrics each having at least one associated first domain metric action list.

In the method of FIG. 20, creating (974) a second domain metric action list (976) in dependence upon the domain state object (914) includes retrieving (971) a first domain user metric associated with the first domain metric vector. In typical examples, the first domain user metric was the user's then-current user metric when the domain state object was created in the first domain.

In the method of FIG. 20, creating (974) a second domain metric action list (976) in dependence upon the domain state object (914) includes retrieving (973) a first domain metric action list (972) associated with the first domain user metric. A first domain metric action list is a list of action IDs used to create a dynamic action list when the user's metric vector is outside of the user's metric space in the first domain.

In the method of FIG. 20, creating (974) a second domain metric action list (976) in dependence upon the domain state object (914) includes identifying (995) an action ID for inclusion in the second domain metric action list in dependence upon the first domain metric action list. In many examples of the method of FIG. 20, identifying an action ID for inclusion in the second domain metric action list in dependence upon the first domain metric action list includes comparing the action IDs in the first domain metric action list with a metric action list table (993). A metric action list table (993) is a data structure including action IDs identifying actions created to be executed in the second domain indexed by other action IDs, such as those created for execution in a first domain. In many examples, the metric action list table includes action IDs for the second domain that are predetermined to affect user condition in a manner similar to other action IDs included in the first domain metric action lists. For example, an action ID identifying an action to turn on a home heater in the home domain may be indexed in the metric action list table by an action ID identifying an action to turn on the car heater in the car domain.

In the method of FIG. 20, creating (974) a second domain metric action list (976) in dependence upon the domain state object (914) includes storing (978) the identified action ID in the second domain metric action list. In some examples of the method of FIG. 20, storing the action ID in the second domain metric action list includes calling a member method in the second domain metric action list object.

In the method of FIG. 20, creating (974) a second domain metric action list (976) in dependence upon the domain state object (914) includes associating (979) the second domain metric action list (976) with a second domain user metric of the second domain user metric vector. In many examples of the method of FIG. 20, associating the second domain metric action list with the second domain user metric includes providing the second domain user metric with a reference to the second domain metric action list.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for administering devices, the method implemented with two data processing domains, a first domain and a second domain, each domain comprising a networked data processing environment, the domains coupled for data communications, the method comprising:
   receiving, in the second domain from the first domain, a domain state object, the domain state object comprising information representing a state of the first domain including information identifying devices within the first domain and a current value of an attribute of those devices within the first domain and information describing a user's current condition within the first domain;
   wherein the user is a human being;
   wherein receiving a domain state object comprises:
      receiving a signal to download the domain state object from a mobile sensor;
      receiving an address of the domain state object from the mobile sensor; and
      downloading the domain state object from the address;
   identifying by the second domain an action in dependence upon the domain state object;
      wherein identifying an action in dependence upon the domain state object comprises:
      retrieving a current device state object from the domain state object;
      selecting an action ID in dependence upon the current device state object; and
   executing the action by the second domain.

2. The method of claim 1 further comprising creating a second domain metric vector for the second domain in dependence upon the domain state object.

3. The method of claim 1 further comprising creating a second domain metric action list in dependence upon the domain state object.

4. The method of claim 1 further comprising selecting a second domain user metric space in dependence upon the domain state object.

5. A system for administering devices, the system comprising:
   a computer processor, a computer memory operatively coupled to the computer processor, the computer memory having disposed within it:
   means for receiving, in a second domain, a domain state object; the domain state object comprising information representing a state of a first domain including information identifying devices within the first domain and a current value of an attribute of those devices within the first domain and information describing a user's current condition within the first domain;
   wherein the user is a human being;
   wherein means for receiving a domain state object comprises:
      means for receiving a signal to download the domain state object from a mobile sensor;
      means for receiving an address of the domain state object from the mobile sensor; and
      means for downloading the domain state object from the address;
   means for identifying an action in dependence upon the domain state object;
   wherein means for identifying an action in dependence upon the domain state object comprises:
      means for retrieving a current device state object from the domain state object; and
      means for selecting an action ID in dependence upon the current device state object; and
   means for executing the action by the second domain.

6. The system of claim 5 further comprising means for creating a second domain metric vector for the second domain in dependence upon the domain state object.

7. The system of claim 5 further comprising means for creating a second domain metric action list in dependence upon the domain state object.

8. The system of claim 5 further comprising means for selecting a second domain user metric space in dependence upon the domain state object.

9. A computer program product for administering devices, the computer program product comprising:
   a recording medium;
   means, recorded on the recording medium, for receiving, in a second domain, a domain state object; the domain state object comprising information representing a state of a first domain including information identifying devices within the first domain and a current value of an attribute of those devices within the first domain and information describing a user's current condition within the first domain;
   wherein the user is a human being;
   wherein means, recorded on the recording medium, for receiving a domain state object comprises:
      means, recorded on the recording medium, for receiving a signal to download the domain state object from a mobile sensor;
      means, recorded on the recording medium, for receiving an address of the domain state object from the mobile sensor; and
      means, recorded on the recording medium, for downloading the domain state object from the address;
   means, recorded on the recording medium, for identifying an action in dependence upon the domain state object;
   wherein means, recorded on the recording medium, for identifying an action in dependence upon the domain state object comprises:
      means, recorded on the recording medium, for retrieving a current device state object from the domain state object; and
      means, recorded on the recording medium, for selecting an action ID in dependence upon the current device state object; and
   means, recorded on the recording medium, for executing the action by the second domain.

10. The computer program product of claim 9 further comprising means, recorded on the recording medium, for creating a second domain metric vector for the second domain in dependence upon the domain state object.

11. The computer program product of claim 9 further comprising means, recorded on the recording medium, for creating a second domain metric action list in dependence upon the domain state object.

12. The computer program product of claim 9 further comprising means, recorded on the recording medium, for selecting a second domain user metric space in dependence upon the domain state object.

* * * * *